United States Patent
Alten

(10) Patent No.: US 9,465,930 B2
(45) Date of Patent: Oct. 11, 2016

(54) FINGERPRINT GESTURES

(71) Applicant: Dropbox, Inc., San Francisco, CA (US)

(72) Inventor: Brett Alten, Cupertino, CA (US)

(73) Assignee: Dropbox, Inc., San Francisco, CA (US)

( * ) Notice: Subject to any disclaimer, the term of this patent is extended or adjusted under 35 U.S.C. 154(b) by 35 days.

(21) Appl. No.: 14/474,002

(22) Filed: Aug. 29, 2014

(65) Prior Publication Data

US 2016/0063230 A1 Mar. 3, 2016

(51) Int. Cl.
G06F 21/00 (2013.01)
G06F 21/32 (2013.01)

(52) U.S. Cl.
CPC ....... *G06F 21/32* (2013.01); *G06F 2221/2147* (2013.01)

(58) Field of Classification Search
CPC combination set(s) only.
See application file for complete search history.

(56) References Cited

U.S. PATENT DOCUMENTS

| 2006/0190836 A1 | 8/2006 | Ling Su et al. |
| 2009/0083847 A1 | 3/2009 | Fadell et al. |
| 2010/0134248 A1 | 6/2010 | Adams et al. |
| 2010/0225607 A1* | 9/2010 | Kim .................. G06F 3/042 345/173 |
| 2012/0306769 A1* | 12/2012 | Zhu et al. ........... G06F 3/04883 345/173 |
| 2013/0129162 A1 | 5/2013 | Cheng et al. |

FOREIGN PATENT DOCUMENTS

| JP | 2007058540 A2 | 3/2007 |
| WO | 2013/022431 A1 | 2/2013 |
| WO | 2013/173838 A2 | 11/2013 |

* cited by examiner

*Primary Examiner* — Ghazal Shehni
(74) *Attorney, Agent, or Firm* — Hickman Palermo Becker Bingham LLP

(57) ABSTRACT

User authentication for a user device can leverage one or more fingerprint sensor regions installed in the device capable of detecting and/or recognizing a user's fingerprints. The user can define a fingerprint gesture or sequence of fingerprint gestures as a passcode, with access to a protected function being conditional on the user performing the defined fingerprint gesture or sequence of fingerprint gestures. In some instances, different fingerprint gestures or fingerprint gesture sequences can invoke or authorize different functions of the device. In some instances, fingerprint gestures from two or more users in the same location or in different locations can be used to unlock a protected function of a device.

20 Claims, 19 Drawing Sheets

FINGERPRINT GESTURES

BACKGROUND

This relates generally to user authentication and in particular to authentication based on fingerprint gestures.

Mobile computing and communication devices, such as smart phones and tablets, can provide users with easy access to information, including personal information (e.g., contacts, email, other personal communications) and general reference information (e.g., stock prices, maps, world wide web content, etc.). Because such devices tend to be small and highly portable, they are easily lost or stolen. Once a device is out of its owner's hands, an unauthorized party may be able to access personal information or operate other functions of the device to the owner's detriment.

Various security measures have been implemented to try to make it more difficult for unauthorized parties to access information or operate other functions of a mobile device. For example, many mobile devices allow the user to set a passcode (typically a sequence of digits and/or letters and/or other symbols). The device can enter a locked state in response to various events, such as the user operating a lock control or user inactivity over some period of time. In the locked state, access to functions of the device can be limited (e.g., a subset of device functions that do not expose personal data may be accessible) or disabled entirely. Once in the locked state, the user can be required to enter the passcode in order to unlock the device and thereby obtain access to its functions. Entry of the passcode can be said to authenticate the user (i.e., verify that the person attempting to use the device is authorized to do so), and such authentication can be reliable as long as the passcode is not known to (or guessed by) anyone else.

Secure (i.e., difficult to guess) passcodes, however, are generally at odds with ease of use. For example, some devices provide an option to set a four-digit numeric passcode. Most users select a four-digit number that they find easy to remember and enter. However, because there are only 10,000 possible four-digit passcodes (not all of which are equally easy to remember), such passcodes are not particularly secure. More secure passcodes can be created, for instance, by requiring the user to include a mix of letters, numbers, and/or other symbols in the passcode. Such passcodes can be harder to guess than four-digit codes, but they can also be harder for the user to remember or enter, making them less appealing. Thus, tradeoffs are often required between securing the device and making it easy to use.

SUMMARY

Certain embodiments of the present invention relate to techniques for user authentication that can provide both security and ease of use for a user device such as a mobile computing and communication device. These techniques can leverage one or more fingerprint sensor regions that are capable of detecting a user's fingerprints. In some embodiments, fingerprint sensor region(s) can identify which of the user's fingers made contact (e.g., identifying the fingerprint as belonging the user's thumb, index finger, middle finger; right index finger versus left index finger, etc.), also referred to as recognizing a fingerprint. Where the device has one or more fingerprint sensor regions, the user can define a fingerprint gesture or sequence of fingerprint gestures as a passcode that can be used to restrict access to the device or to particular functions, and access to a protected function can be made conditional on the user performing the defined fingerprint gesture or sequence of fingerprint gestures. A "fingerprint gesture" as used herein can include a specific fingerprint making contact with a specific one of the fingerprint sensor regions of the device. In some embodiments, a fingerprint gesture can also incorporate motion, such as dragging a specific finger from one location to another or in a particular direction; as long as the motion path crosses a fingerprint sensor region, the finger being used can be identified. In some embodiments, a fingerprint gesture can also incorporate a specific duration of the contact between the fingerprint and the fingerprint sensor region. For instance, a "long" contact (e.g., finger held in contact with the sensor for at least a minimum time such as 1 second or 2 seconds or the like) from a "short" contact (e.g., finger held in contact with the sensor for less than the minimum time). In some embodiments, different fingerprint gestures or fingerprint gesture sequences can invoke or authorize different functions of the device. For instance, one fingerprint gesture (or sequence) can unlock a device and present a home screen while a different fingerprint gesture (or sequence) can unlock the device and launch one or more specified application programs (also referred to applications or apps), such as an email application. Different fingerprints or fingerprint gestures (or sequences) can be used to unlock different sets of data and/or apps.

Further, where a device has multiple fingerprint sensor regions capable of recognizing specific fingerprints, fingerprint gestures from two or more users can be used to unlock a device or a specific function of the device. For instance, a child may be allowed to use the device to purchase goods, data, or services only if both the child and a parent input a recognized fingerprint gesture. The child and the parent can input their fingerprint gestures on the same device or on different devices as desired, in a specified or unspecified order.

The following detailed description together with the accompanying drawings will provide a better understanding of the nature and advantages of the present invention.

BRIEF DESCRIPTION OF THE DRAWINGS

FIG. 9A shows a back view of a user device; FIG. 9B shows a left side view; and FIG. 9C shows a right side view.

DETAILED DESCRIPTION

Certain embodiments of the present invention relate to techniques for user authentication that can provide both security and ease of use for a user device such as a mobile computing and communication device. These techniques can leverage one or more fingerprint sensor regions that are capable of detecting a user's fingerprints. In some embodiments, fingerprint sensor region(s) can identify which of the user's fingers made contact (e.g., identifying the fingerprint as belonging the user's thumb, index finger, middle finger; right index finger versus left index finger, etc.), also referred to as recognizing a fingerprint. Where the device has one or more fingerprint sensor regions, the user can define a fingerprint gesture or sequence of fingerprint gestures as a passcode that can be used to restrict access to the device or to particular functions, and access to a protected function can be made conditional on the user performing the defined fingerprint gesture or sequence of fingerprint gestures. A "fingerprint gesture" as used herein can include a specific fingerprint making contact with a specific one of the fingerprint sensor regions of the device. In some embodiments, a fingerprint gesture can also incorporate motion, such as dragging a specific finger from one location to another or in a particular direction; as long as the motion path crosses a fingerprint sensor region, the finger being used can be identified. In some embodiments, a fingerprint gesture can also incorporate a specific duration of the contact between the fingerprint and the fingerprint sensor region. For instance, a "long" contact (e.g., finger held in contact with the sensor for at least a minimum time such as 1 second or 2 seconds or the like) from a "short" contact (e.g., finger held in contact with the sensor for less than the minimum time). In some embodiments, different fingerprint gestures or fingerprint gesture sequences can invoke or authorize different functions of the device. For instance, one fingerprint gesture (or sequence) can unlock a device and present a home screen while a different fingerprint gesture (or sequence) can unlock the device and launch one or more specified application programs (also referred to applications or apps), such as an email application. Different fingerprints or fingerprint gestures (or sequences) can be used to unlock different sets of data and/or apps.

Further, where a device has multiple fingerprint sensor regions capable of recognizing specific fingerprints, fingerprint gestures from two or more users can be used to unlock a device or a specific function of the device. For instance, a child may be allowed to use the device to purchase goods, data, or services only if both the child and a parent input a recognized fingerprint gesture. The child and the parent can input their fingerprint gestures on the same device or on different devices as desired, in a specified or unspecified order.

Figure 1:
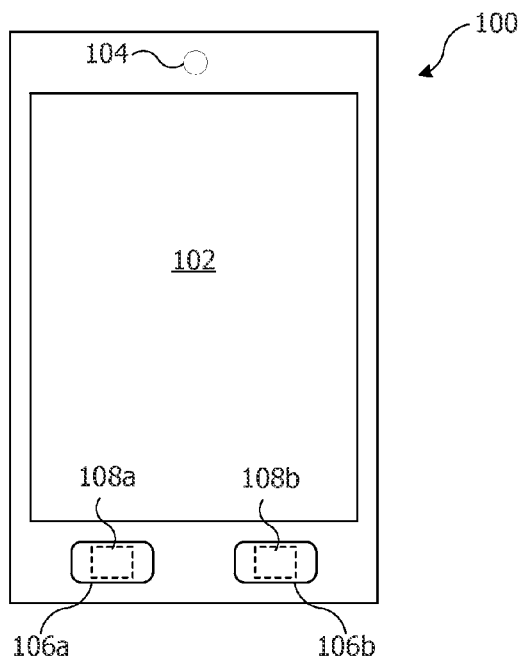
FIG. 1 shows an example of a user device that can be operated according to an embodiment of the present invention.

FIG. 1 shows an example of user device 100 that can be operated according to an embodiment of the present invention. User device 100 can be, for instance, a smart phone or tablet or other mobile device. User device 100 can have display 102 to present visual information to a user. In some embodiments, display 102 can be a touch-screen display capable of detecting when a user touches a location on the screen with one or more fingers and/or performs a touch gesture on the screen by moving one or more fingers along the surface of the screen. User device 100 can include camera 104 operable to capture still and/or images. In this example, camera 104 is a "front-facing" camera that can, for example, capture an image of the user while the user is looking at device 100. Control buttons 106 (two buttons, 106a and 106b are shown) can be operable by the user to perform various functions such as operating camera 104, activating or deactivating display 102, invoking specific functions of user device 100, and/or locking or unlocking user device 100.

In this example, control buttons 106a, 106b can each incorporate a fingerprint sensor region 108a, 108b. Fingerprint sensor regions 108a, 108b can be implemented using various technologies, examples of which are known in the art. For instance, an optical fingerprint sensor disposed within either of fingerprint sensor regions 108a, 108b can capture a high-resolution image of a finger that contacts button 106a, 106b and can analyze the image to determine the relative position of various fingerprint features such as ridges, valleys, arches, whorls, etc. A capacitive fingerprint sensor disposed within either of fingerprint sensor regions 108a, 108b can detect fingertip features based on differences in capacitance in different portions of the sensor while the user's finger is in contact with the sensor. Other types of fingerprint sensors can also be used. In some embodiments, fingerprint sensor regions 108a, 108b can detect a fingerprint when the user touches the corresponding control button 106a, 106b, and pressing button 106a or 106b hard enough to actuate it is not required to perform fingerprint detection. In other embodiments, operation of fingerprint sensor regions 108a, 108b can be triggered by actuation of button 106a or 106b.

Figure 2:
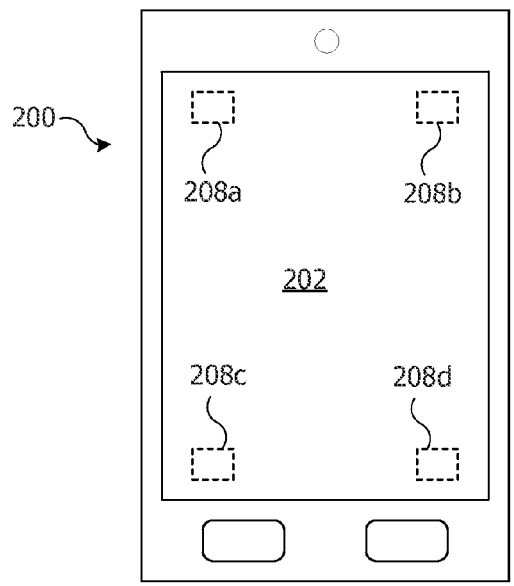
FIG. 2 shows another example of a user device that can be operated according to an embodiment of the present invention.

FIG. 2 shows another example of user device 200 that can be operated according to an embodiment of the present invention. User device 200 can be generally similar to user device 100. For instance, display 202 can be similar to display 102 (e.g., a touch-screen display), and camera 204 can be similar to camera 104. Control buttons 206 can be similar to control buttons 106.

In this example, fingerprint sensor regions 208a-208d are incorporated into various areas or regions within display 202. Thus, if display 202 is a touch screen, in addition to detecting where the user touches display 202, if the touch is within the coverage area of one of fingerprint sensor regions 208a-208d, the touched one of fingerprint sensor regions 208a-208d can detect features of the user's fingerprint. Thus, it can be possible for user device 200 to determine not only where the user touched display 202 but also whether a finger was used and in some instances which finger was used. It should be noted that while four fingerprint sensor regions 208a-208d are shown, the number of fingerprint sensor regions 208 and the coverage area of each can be modified as desired; for example, all or most of the area of display 202 can operate as a fingerprint sensor region, or a portion of display 202 that is capable of sensing fingerprints can be logically subdivided into multiple fingerprint sensor regions. In this example, one or more fingerprint sensor regions can be implemented by providing a high-resolution capacitive touch screen overlay for all or part of display 202; other technologies can also be used.

It will be appreciated that user devices 100 and 200 are illustrative and that variations and modifications are possible. For instance, any number of control buttons can be provided, and any number of fingerprint sensor regions can also be provided. In some embodiments, there can be control buttons that do not incorporate a fingerprint sensor region. Further, in some embodiments, fingerprint sensor regions can be incorporated into one or more control buttons (as shown in FIG. 1) and into a touch-screen display (as shown in FIG. 2). In addition or instead, one or more fingerprint sensor regions can be provided independently of other control elements. For example, a fingerprint sensor region can be located in the upper bezel of user device 100 or user device 200. Further, as described below, a fingerprint sensor region can be located on a side and/or back surface of user device 100 or user device 200. A "fingerprint sensor region" as used herein can include any region on any surface of a user device that is capable of detecting a fingerprint. For instance, a single touch-screen display that can detect fingerprints in various areas (including adjacent or non-adjacent areas) within the display can be operated as multiple fingerprint sensor regions by logically subdividing the display into fingerprint sensor regions; the boundaries and/or size of the fingerprint sensor regions can be variable. A fingerprint sensor region can be said to detect a fingerprint if it detects that an object having fingerprint-like features (such as ridges, valleys, arches, whorls, etc.) is in contact with the sensor. In some instances, a fingerprint sensor region can also be used to recognize a specific fingerprint, e.g., as described below. Any number (one or more) of fingerprint sensor regions can be provided, and different fingerprint sensor regions can be of the same type or different types as desired.

In some embodiments, user device 100 or 200 can be placed into a locked state. As used herein, a "locked" state can be a state that allows only a minimum level access to its functionality. For example, the locked state of some devices may allow no access to any functionality other than unlocking the device. Other devices may allow limited access to selected functionality while locked; for instance, the user may be able to check the time, view recent notifications, operate a flashlight feature, or the like. "Unlocking" a device can include any operation that results in the device transitioning from the locked state to an "unlocked" state in which access to a greater level of functionality is granted, such as viewing personal data, launching various applications, etc. For example, upon becoming unlocked, the device may present a "home screen" showing icons for various applications that can be launched, a user interface screen related to an app that was executing when the device became locked, or some other user interface screen that allows the user to invoke or interact with functions of the device (including at least one function that is not available in the locked state). Unlocking the device can be understood as granting access to protected functions of a user device, where the protected functions include functions that are not available in the locked state but become available in the unlocked state. In some embodiments, granting access to a protected function can occur in stages. For instance, the user can unlock the device using a first authentication operation (e.g., a first fingerprint gesture or fingerprint gesture sequence as described below) and launch a particular app, and the app can prompt the user to perform a second authentication operation (e.g., a second fingerprint gesture or fingerprint gesture sequence).

Figure 3:
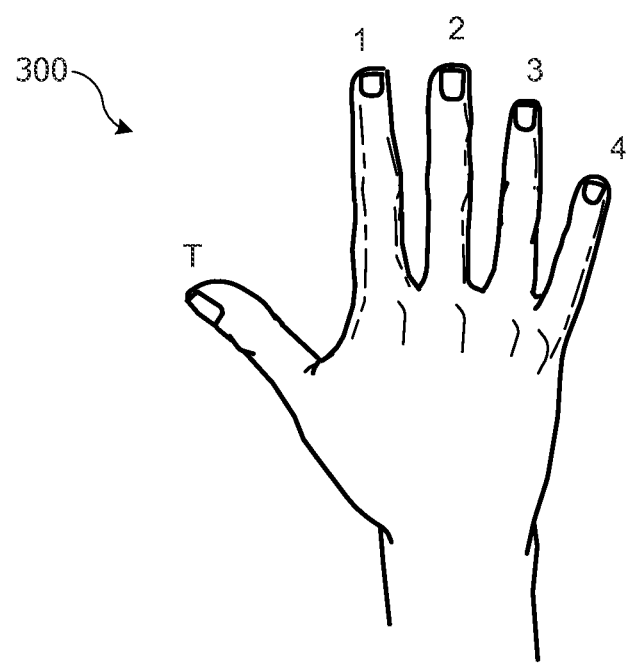
FIG. 3 shows a finger-identification schema that can be used in connection with an embodiment of the present invention.

Fingerprint information detected by a fingerprint sensor region in a user device, such as user device 100 or user device 200, can be used to recognize the various fingerprints of an authorized user and to associate the fingerprints with specific fingers. For example, FIG. 3 shows hand 300, with five fingers labeled T (thumb), 1 (index finger or first finger), 2 (middle finger or second finger), 3 (ring finger or third finger), and 4 (pinky or fourth finger). This labeling is used throughout the present description. To program the user device to recognize each fingerprint, some embodiments can provide a fingerprint registration operation that can be invoked at a time when an authorized user is assumed to be using the device. For example, the fingerprint registration operation can be invoked during initial device setup or by first unlocking the device using a passcode, then accessing a settings menu or the like. The fingerprint registration operation can prompt the user to touch a fingerprint sensor region with a specific finger. For instance, with reference to FIG. 1, the prompt can say "Touch your right thumb to the right control button," which would result in the user touching thumb T of FIG. 3 to control button 106b, thereby contacting fingerprint sensor region 108b. With reference to FIG. 2, the prompt can highlight the region of display 202 corresponding to one of fingerprint sensor regions 208a-208d and present a text or voice prompt such as "Touch your right thumb to the highlighted area." Regardless of the specific prompt, when the user touches the fingerprint sensor region, the sensor can detect the fingerprint and analyze the fingerprint to identify key features (e.g., specific patterns of ridges, valleys, whorls, arches, and the like). The user device can store a representation of the fingerprint or the key features to facilitate subsequent matching of a detected fingerprint. In some embodiments, the user can be prompted to repeat the action for the same finger multiple times to improve the representation. The user can also be prompted to touch a fingerprint sensor region with each finger one or more times, allowing each of the user's fingerprints to be registered. Any number of fingerprints can be registered. In some embodiments, all fingers of one hand are registered; in some embodiments, all fingers of both hands are registered. In some embodiments, the fingerprint registration option can also include registering one or more fingerprints of a second user. This can, for example, allow the second user to act as an authorizer for the first user, as described below. After one or more fingerprints have been registered, a detected fingerprint can be recognized by comparing data representing features of the detected fingerprint to the stored fingerprint representation(s), with the detected fingerprint being recognized if the features match to a sufficient degree.

In some embodiments, registered fingerprint features can be stored securely for each fingerprint sensor region, and the user can be prompted to register fingerprints for each fingerprint sensor region separately, allowing different fingerprint sensor regions to recognize different subsets of the user's fingerprints. In some embodiments, stored data regarding registered fingerprint features is available for all fingerprint sensor regions on the device. For instance, there can be a single fingerprint coprocessor that stores the set of registered fingerprints for the device. The fingerprint coprocessor can receive fingerprint feature data from any of the fingerprint sensor regions on the device and compare the feature data to the set of registered fingerprints to determine whether a match exists. Based on the comparison, the fingerprint coprocessor can output a "match" or "non-match" decision, an indication of which of the registered fingerprint was matched (e.g., "matched: right thumb", etc.), a score indicating the quality of the best match, or the like. In some embodiments, there can be different fingerprint coprocessors to perform fingerprint recognition using data from different fingerprint sensor regions, and different fingerprint coprocessors can recognize different sets or subsets of fingerprints.

Output from a fingerprint coprocessor or other fingerprint recognition process can be used by other processes to control access to and/or operation of the device based on fingerprint gestures. As used herein, a "fingerprint gesture" can refer generally to a specific fingerprint making contact with a specific fingerprint sensor region of a user device. In some embodiments, a fingerprint gesture can also incorporate motion, such as dragging a specific finger from one location to another; as long as the motion path crosses a fingerprint sensor region, the finger being used can be identified based on the detected fingerprint. In some embodiments, a fingerprint gesture can also incorporate a specific duration of the contact between the fingerprint and the fingerprint sensor region. For instance, a "long" contact (e.g., finger held in contact with the sensor for at least a minimum time such as 1 second or 2 seconds or the like) from a "short" contact (e.g., finger held in contact with the sensor for less than the minimum time). In another example, a fingerprint gesture can include a sequence of simple gestures such as a short or long contact, or touch, at one sensor location followed by a swipe motion (e.g., in a particular direction).

Examples of controlling access to and/or operation of a user device based on fingerprint gestures will now be described. In these examples, it is assumed that the authorized user has already registered a set of fingerprints in the device.

Figure 4:
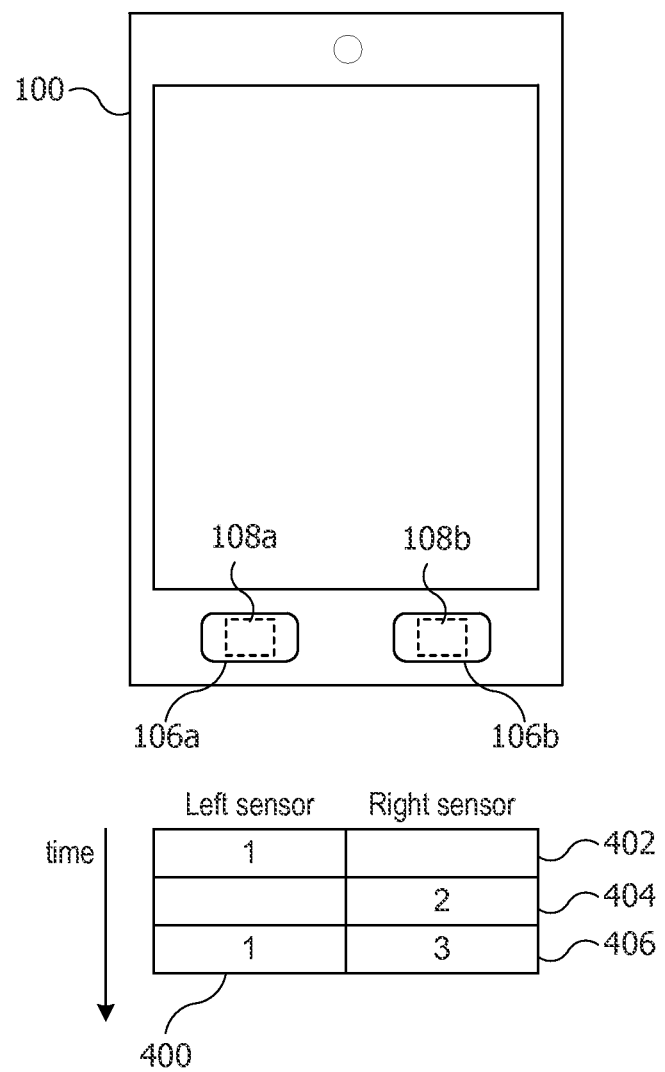
FIG. 4 shows an example of a fingerprint gesture sequence to unlock a user device according to an embodiment of the present invention.

In one example, a fingerprint gesture sequence can be used in place of a passcode to unlock a device. FIG. 4 shows an example of using a fingerprint gesture sequence to unlock user device 100 according to an embodiment of the present invention. Chart 400 shows a temporal sequence of fingerprint gestures. Symbols in the left column identify a finger touching fingerprint sensor region 108a, and symbols in the right column identify a finger touching fingerprint sensor region 108b.

Chart 400 shows that at first time 402, finger 1 (as defined in FIG. 3) touches fingerprint sensor region 108a; at second time 404, finger 2 touches fingerprint sensor region 108b; and at third time 406, finger 1 touches fingerprint sensor region 108a and finger 3 concurrently touches fingerprint sensor region 108b. Each of these touches can be regarded as a fingerprint gesture, and the sequence of fingerprint gestures can be defined as a passcode to unlock device 100. It should be noted that this passcode requires the correct sequence of touches by the correct fingers. The sequence is short and can be easily remembered and executed by the authorized user. However, although the sequence can be readily observed by a would-be intruder (i.e., an unauthorized user), the intruder would not be able to make use of this information without also spoofing three registered fingerprints of the authorized user. Thus, a fingerprint gesture sequence can be more secure than a conventional passcode of similar length. This can make it easier for an authorized user to access functions of the device while preventing unauthorized users from doing so.

Figure 5:
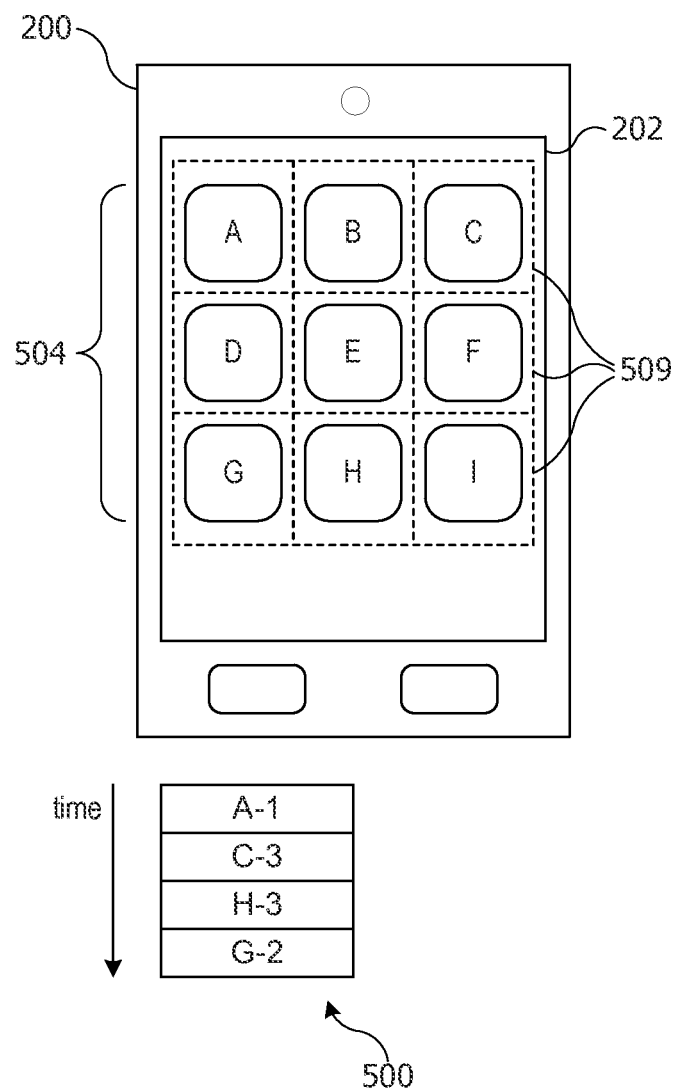
FIG. 5 shows another example of a fingerprint gesture sequence to unlock a user device according to an embodiment of the present invention.

FIG. 5 shows an example of a fingerprint gesture sequence for unlocking user device 200 according to an embodiment of the present invention. In this example, display 202 presents a keypad interface with virtual keys 504 labeled A-I. It is assumed for purposes of this example that all portions of the active area of display 202, or at least the portion on which keys 504 are displayed, are capable of detecting fingerprints, and display 202 can be subdivided into regions 509 (dashed lines) corresponding to keys 504. Each region 509 can operate as a fingerprint sensor region. Thus, device 200 can determine not only which key 504 a user touches, but also which finger is used. In other embodiments, multiple physically separate fingerprint sensor regions (e.g., sensors 208a-208d as shown in FIG. 2) incorporated into touchscreen display 202 can be substituted, and the virtual keys can correspond to the fingerprint sensor region locations.

Chart 500 shows a temporal sequence of fingerprint gestures. For each time, one of keys 204 is designated (by letter) and a finger to touch the key is designated (by number, using the numbering of FIG. 3). Thus, the user first touches key "A" with finger 1, then key "C" with finger 3, then key "H" with finger 3, then key "G" with finger 2. Each of these touches can be regarded as a fingerprint gesture, and the sequence of fingerprint gestures can be defined as a passcode to unlock device 200. It should be noted that this passcode requires the correct sequence of key touches and also requires the correct finger to touch each key. As with chart 400, the sequence is short and can be easily remembered and executed by the authorized user. However, in order to obtain access using this passcode, an intruder would have to not only know the sequence but also spoof three registered fingerprints. Thus, a fingerprint gesture sequence can be more secure than a conventional passcode of similar length.

It will be appreciated that the passcode examples in FIGS. 4 and 5 are illustrative and that variations and modifications are possible. A passcode based on fingerprint gestures can include any number of gestures. In some embodiments, a minimum number of fingerprint gestures, a minimum number of different fingerprints, and/or a minimum number of different contact locations can be prescribed. In some embodiments, a passcode based on fingerprint gestures can incorporate a motion component, such as drawing or tracing a motion path on the screen from a particular starting location to a particular ending location using a particular finger or fingers. For instance, referring to FIG. 5, in addition to touching a virtual key or sequence of virtual keys, a user can drag a finger from key "A" to another key (e.g., key "H"), and one or more of the corresponding fingerprint sensor regions 509 can detect the fingerprint, e.g., when the user first touches key "A" or when the motion stops at key "H." The motion path can be linear or nonlinear as desired. The motion path can be incorporated along with the fingerprint as a fingerprint gesture, and a passcode can include one or more moving fingerprint gestures. For instance, the user might draw a path from key "A" to key "G" with one finger while drawing a path from key "B" to key "H" with a different finger. In some embodiments, a passcode can incorporate both "onscreen" fingerprint gestures (as in FIG. 5) and "offscreen" fingerprint gestures such as touches of discrete control buttons (as in FIG. 4) or other separate fingerprint sensor regions. Further, where onscreen fingerprint gestures are used, visible virtual keys can be omitted, and the contact locations can be defined, e.g., relative to the first-touched location rather than in absolute screen coordinates.

In some embodiments, a user can define a fingerprint-gesture-based passcode in a manner similar to a conventional passcode. For instance, at a point in time where the user's authorization is assumed (e.g., during initial device setup or when the user has entered a previously established authentication credential), the device can execute a process to allow the user to set a fingerprint-gesture-based passcode. The process can include prompting the user to perform the sequence of fingerprint gestures that will be used as the new passcode; the user can also be prompted to repeat the sequence for confirmation prior to establishing the new passcode. In some embodiments, setting a new passcode may include invalidating a previously-established passcode.

Figure 6:
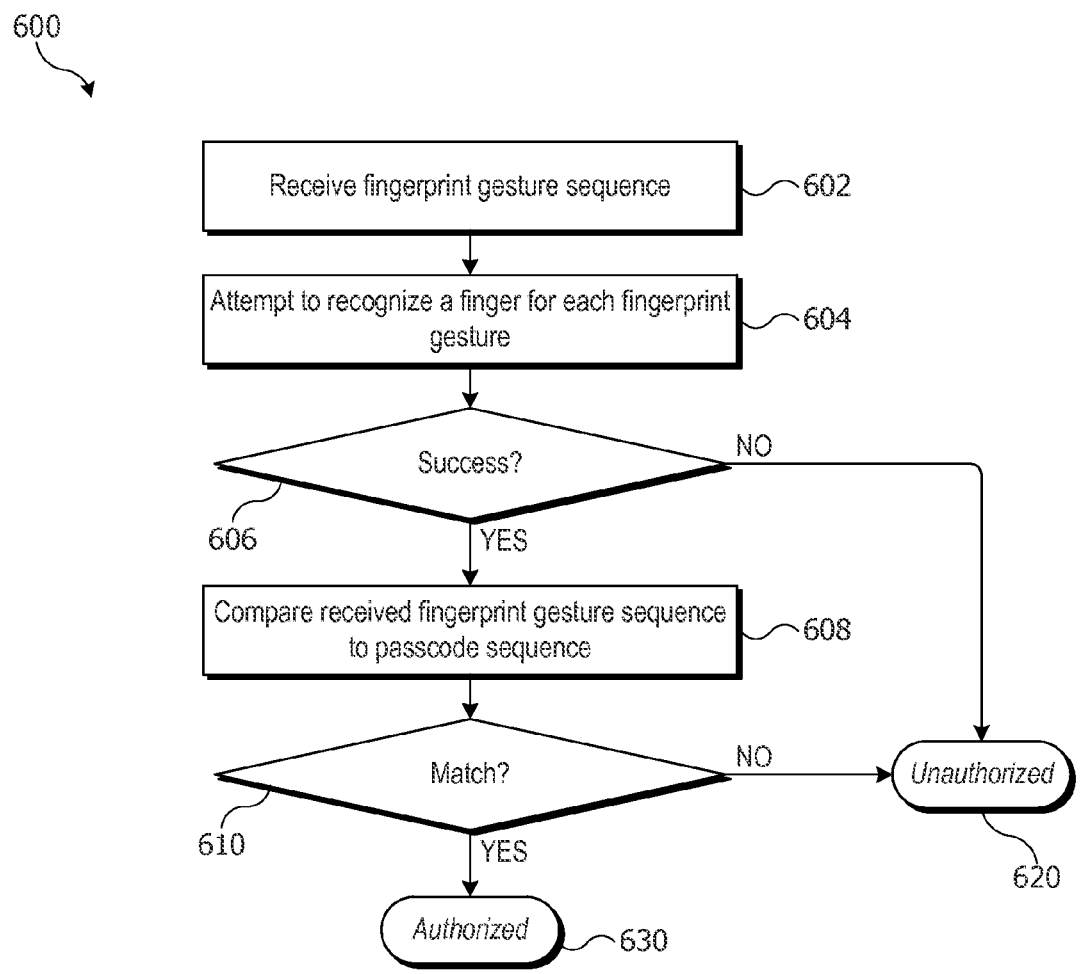
FIG. 6 shows a flow diagram of a process for authorizing access to a protected function of a device according to an embodiment of the present invention.

FIG. 6 shows a flow diagram of process 600 for granting access to a device (or a protected function of a device) using a passcode based on fingerprint gestures according to an embodiment of the present invention. Process 600 can be implemented, e.g., in user device 100 of FIG. 1 or user device 200 of FIG. 2. It is assumed that the user has established a fingerprint-gesture-based passcode prior to execution of process 600. Process 600 can be invoked when a user attempts to access the device or a protected function of the device.

Process 600 can start at block 602, when the user device receives a fingerprint gesture sequence that includes a series of fingerprint gesture descriptors. Each fingerprint gesture descriptor can include data descriptive of a fingerprint gesture performed by a user. For instance, the data can include the detected fingerprint characteristics of the finger (or fingers) that was used and an identifier of the location that was touched (e.g., screen coordinates for an onscreen fingerprint gesture, or an identifier of an offscreen fingerprint sensor region). If the fingerprint gesture includes a motion component, the descriptor can include characteristics of the motion path (e.g., start coordinates, end coordinates, coordinates for one or more intermediate points, path length, speed, etc.). In some embodiments the descriptor can also include a temporal characteristic (e.g., how long the finger remained in contact with the sensor).

At block 604, process 600 can attempt to recognize the fingerprint(s) of the received fingerprint gesture sequence, e.g., by matching the fingerprint characteristics of each fingerprint gesture descriptor to a registered fingerprint (or multiple registered fingerprints if multiple fingers were used in the gesture). At this stage, if a fingerprint is recognized (e.g., if the characteristics of the detected fingerprint match a registered fingerprint), the fingerprint characteristics can be replaced or supplemented with an identifier of the recognized finger. In some embodiments, block 604 can be performed by a fingerprint coprocessor as described above.

At block 606, process 600 can determine whether the attempt at block 604 was successful. In some embodiments, success can be defined as every fingerprint being recognized. In other embodiments, a certain fraction of "misses" (e.g., unrecognized fingerprints) can be allowed; this can make it easier for the user to access the device but may also reduce security. If the attempt is not successful, process 600 can end at block 620 with the user being unauthorized. In some embodiments, the user can be prompted to try again.

At block 608, process 600 can compare the received fingerprint gesture sequence to a previously established passcode sequence. This comparison can include determining whether both the recognized fingers and the locations touched correspond to the previously established passcode sequence (e.g., the sequence in chart 400 of FIG. 4 or chart 500 of FIG. 5). In some embodiments, the match must be exact. In embodiments where a certain fraction of "misses" on the fingerprint recognition can be allowed, the location touched can still be required to match what would have been expected, even if the fingerprint was not recognized. If a fingerprint gesture includes a motion path, the detected motion path can be compared to motion path parameters included in the passcode definition. If a fingerprint gesture includes a temporal characteristic (e.g., long or short contact time, which can be distinguished based on specific numerical thresholds, such as less than one second for short, greater than two seconds for long), the detected temporal characteristic can be compared to the temporal characteristic included in the passcode definition. If the previously established passcode sequence is not matched, process 600 can end at block 620 with the user being unauthorized, in which case access to the protected function is not granted. In some embodiments, the user can be prompted to try again. If the previously established passcode sequence is matched, process 600 can end at block 630 with the user being authorized, in which case access to the protected function is not granted.

It will be appreciated that process 600 is illustrative and that variations and modifications are possible. Steps described as sequential may be executed in parallel, order of steps may be varied, and steps may be modified, combined, added or omitted. For instance, matching of fingerprints and touched locations can be performed concurrently. A fingerprint-gesture-based passcode can be used to access any functionality or feature of the device, and different passcodes can be associated with different functions or features. For instance, a first passcode can be used to unlock the device and allow the user to invoke an application program (e.g., a banking program). Certain features within the application program may require the user to re-enter the first passcode or to enter a second, different passcode. Process 600 can be invoked to verify each passcode.

Further, in some embodiments, multiple fingerprint-gesture-based passcodes can be defined to unlock a device, with different passcodes unlocking the device into a different state. This can facilitate user access to frequently-used functions. For example, the user can have one passcode that unlocks the device into a default starting state (e.g., displaying a home screen from which the user can select an application to launch) and a different passcode that unlocks the device into a customized state (e.g., launching the user's preferred email application).

Figure 7:
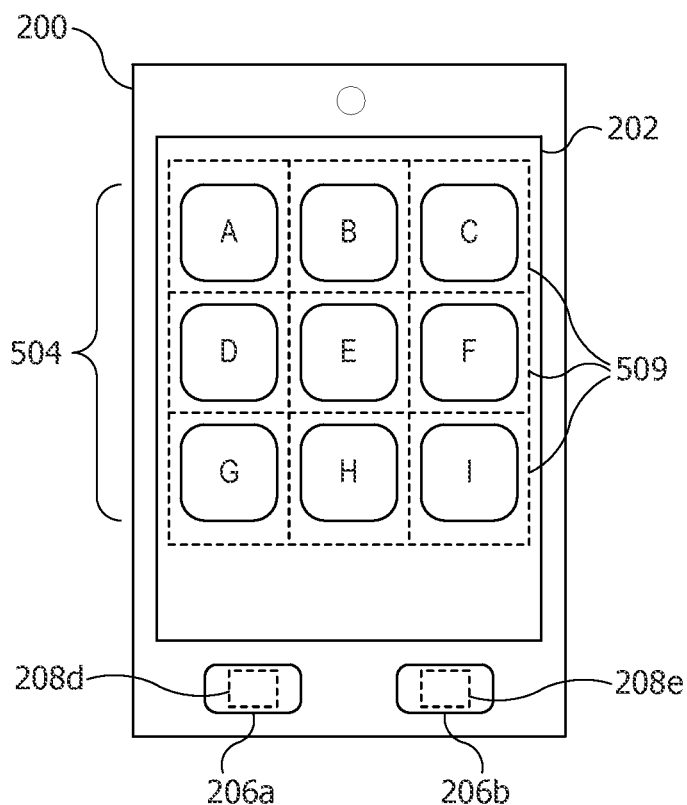
FIG. 7 shows an example of providing multiple passcodes to unlock user device into different states according to an embodiment of the present invention.
Figure 7:
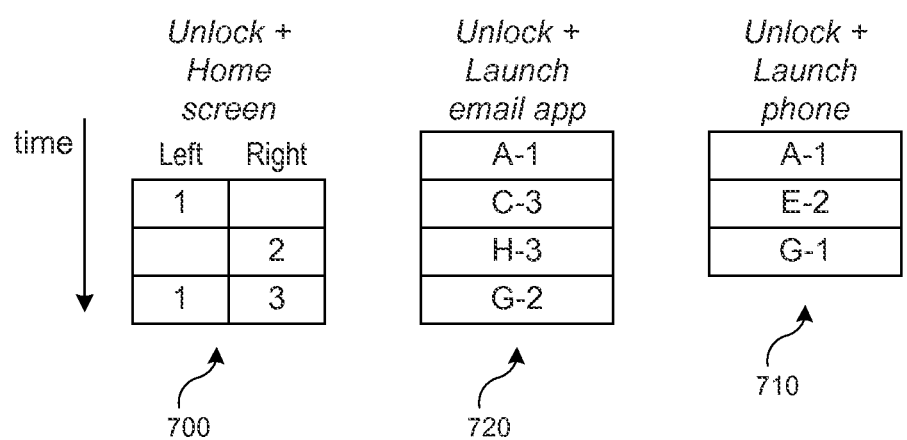

FIG. 7 shows an example of providing multiple passcodes to unlock user device 200 into different states according to an embodiment of the present invention. User device 200 can have a lock screen as shown, with virtual keys 504 as described above with reference to FIG. 5. In this example, control buttons 206a, 206b can incorporate fingerprint sensor regions 208d, 208e (similarly to control buttons 106a, 106b of FIG. 1).

In this example, the user has defined three passcodes, as shown in charts 700, 710, 720. Chart 700 shows a first passcode to unlock the device in the home state. In this example, the passcode is the same as that shown in chart 400 of FIG. 4 and uses fingerprint sensor regions 208d, 208e. Chart 710 shows a second passcode to unlock the device and launch a phone application, allowing the user to make a call. In this example, the second passcode uses keys 504: key "A" is touched with finger 1, followed by key "E" with finger 2, followed by key "G" with finger 1. Chart 720 shows a third passcode to unlock the device and launch an email application, allowing the user to read and/or send emails. In this example, the third passcode is the same as that shown in chart 500 of FIG. 5. Any number of passcodes can be defined in this manner, and a suitable user interface can be provided to allow the user to establish passcodes and link them to specific device functions or applications to be launched in response to the passcode. The passcodes can be short, and a user may be able to remember several different passcodes. Further, the user can structure the passcodes to make them easier to remember. For instance, the passcodes can each include four fingerprint gestures, with the first three being the same and the fourth being changed depending on the desired function or application to be launched.

Figure 8:
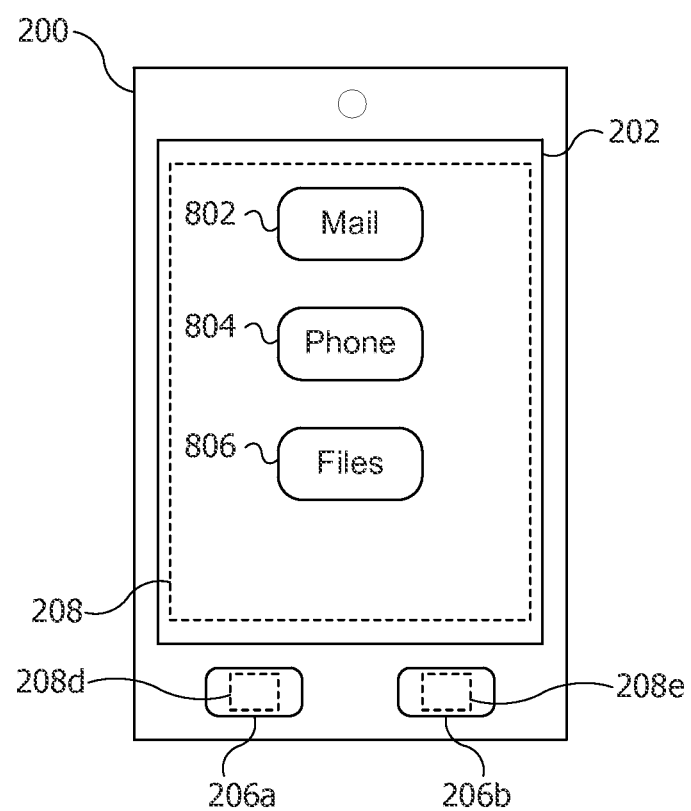
FIG. 8 shows an example of an interface screen usable to unlock the device and launch an application according to an embodiment of the present invention.

In another embodiment, onscreen and offscreen fingerprint gestures can be combined to specify the function or application to launch when the device is unlocked. FIG. 8 shows an example of user device 200 presenting interface screen 800 on display 202 that is usable to unlock the device and launch an application according to an embodiment of the present invention. In this example, the user can touch region 802 of screen 802 with a specific finger to select the email application. The user can alternatively touch region 804 with a specific finger (which can be the same finger or a different finger) to select the phone application. The user can alternatively touch region 806 with a specific finger (again, the same finger or a different finger) to select a file-management application. Although three options are shown, any number of options can be provided. After making a selection, the user can enter a fingerprint-gesture-based passcode using fingerprint sensor regions 208a, 208b (e.g., similarly to FIG. 4 described above). Assuming the user enters the correct passcode, device 200 can be unlocked and the selected app can be launched.

Numerous variations are possible. For instance, the user can touch the screen region corresponding to the desired app after entering the passcode. As another example, passcode entry can be performed using onscreen rather than offscreen fingerprint sensor regions. In some embodiments, the presented options on screen 800 can include an option to present a home screen rather than launching an application. In some embodiments, if the user enters a passcode without selecting an option from screen 800, this can be treated as an instruction to unlock the device and present the home screen. In some embodiments, the regions for particular apps might not be drawn on the display; the user can define and/or remember the mapping of regions to apps. In some embodiments, the mapping can be to a particular finger used rather than to the region touched (e.g., finger 1 for home screen, finger 2 for phone, finger 3 for email, etc.).

Additional security can also be provided by requiring continuous (or nearly continuous) contact between a user's finger and a fingerprint sensor region during device operation. Such a requirement may not be particularly convenient for the user if the fingerprint sensor regions are located on the device face (e.g., as shown in FIGS. 1 and 2). However, for a different placement of fingerprint sensor regions, such as on the back and/or side surfaces of the device, maintaining contact during device operation may be quite natural.

Figure 9A:
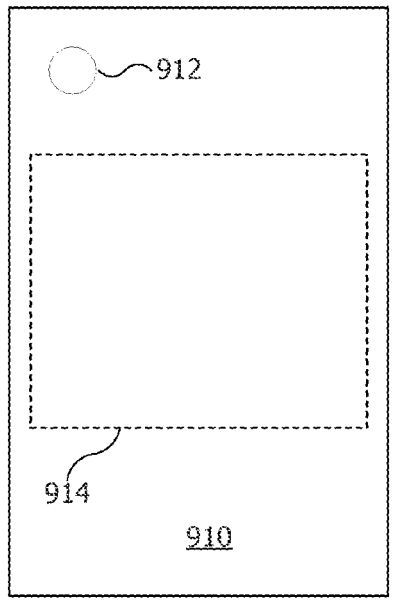
FIGS. 9A-9C show examples of fingerprint sensor regions on the back and side surfaces of a user device according to an embodiment of the present invention.
Figure 9B:
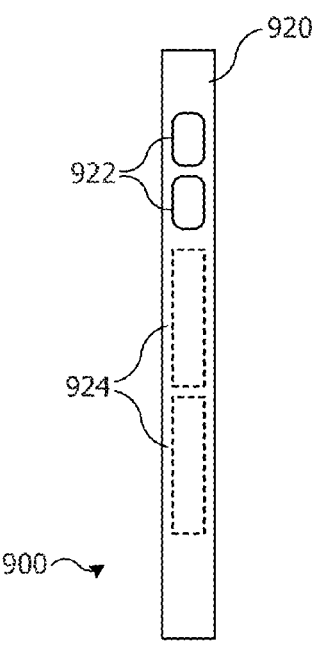
Figure 9C:
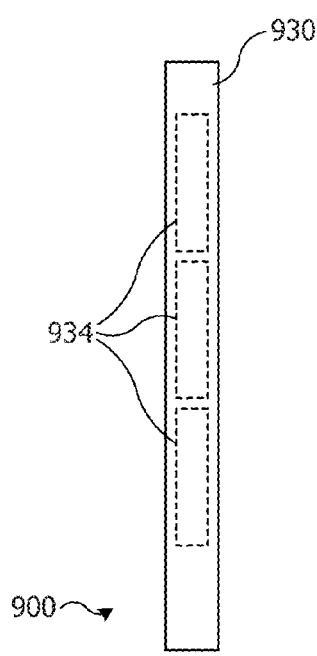

FIGS. 9A-9C show examples of fingerprint sensor regions on the back and side surfaces of a user device 900 according to an embodiment of the present invention. FIG. 9A shows a back view of user device 900, FIG. 9B shows a left side view, and FIG. 9C shows a right side view. User device 900 can correspond to user device 100 of FIG. 1 or user device 200 of FIG. 2.

As shown in FIG. 9A, back surface 910 of device 900 can provide features such as rear-facing camera 912. Back surface 910 can also provide one or more fingerprint sensor regions 914 that can cover any portion of surface 910. If a user naturally holds device 900 with a finger resting against fingerprint sensor region 914, continuous contact with the user's finger can be maintained.

As shown in FIG. 9B, side surface 920 of device 900 (e.g., left side surface) can provide features such as volume controls 922. Other areas of side surface 920 can provide one or more fingerprint sensor regions 924. If the user naturally holds device 900 with a finger resting against one or more of fingerprint sensor regions 924, continuous contact with the user's finger can be maintained.

As shown in FIG. 9C, another side surface 930 of device 900 (e.g., right side surface) can provide one or more fingerprint sensor regions 934. If the user naturally holds device 900 with a finger resting against one or more of fingerprint sensor regions 934, continuous contact with the user's finger can be maintained.

Sensors arranged as shown in FIGS. 9A-9C can be used in some embodiments to implement a "continuous contact" feature that can enhance device security, e.g., by automatically locking the device if contact between a user's finger and a fingerprint sensor region is broken. In some embodiments, "continuous contact" is considered to be maintained if a finger continuously (or nearly continuously) maintains contact with any one of sensors 914, 924, 934. Further, fingerprint sensor regions 914, 924, 934 can detect fingerprint characteristics, and these can be matched to registered fingerprints; accordingly, maintaining continuous contact can also require that the finger in contact match a registered fingerprint. It should be noted that fingerprints used for purposes of detecting continuous contact can be different from any fingerprints registered for use with front-surface fingerprint sensor regions. For instance, at a time when the user's authorization has already been established, the user can be prompted to hold the device in a natural operating position, and fingerprint sensor regions 914, 924, 934 can be operated to detect fingerprint features. These features can be recorded and registered as fingerprints. It should be noted that although the term "fingerprint" is often associated with a region near the end of a finger, other portions of a user's fingers or hand can have detectable skin features (lines, ridges, veins, etc.), and a registered fingerprint can be understood as including features of any portion of the user's finger or hand, not limited to fingertips.

Figure 10:
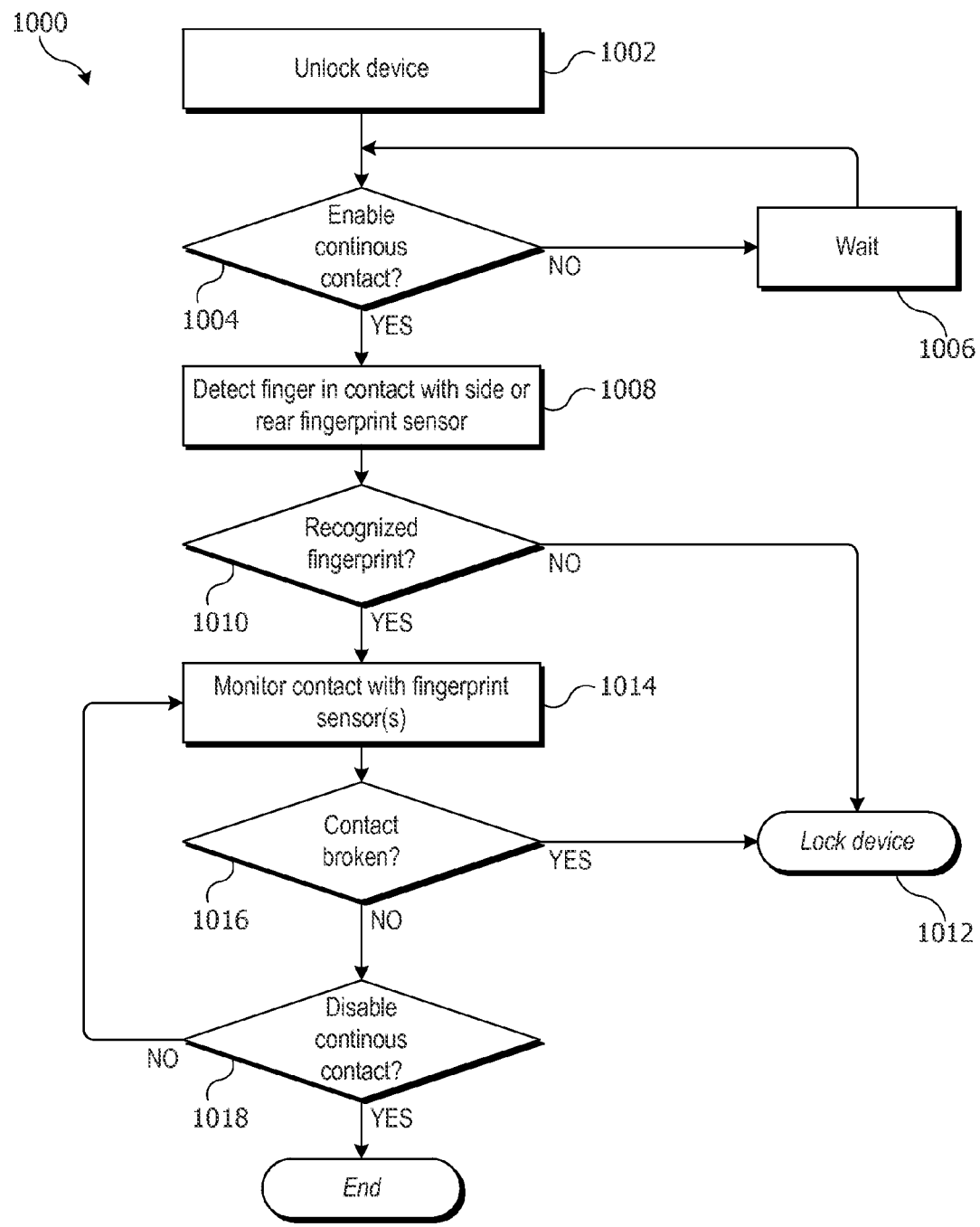
FIG. 10 shows a flow diagram of a process for implementing a continuous contact feature according to an embodiment of the present invention.

A continuous contact feature can be active at all times when device 900 is unlocked, or it can be invoked selectively, e.g., when the user is using a particular application or accessing sensitive data. In some embodiments, the user can expressly enable or disable the continuous contact feature, for instance, to provide enhanced security when using device 900 in a high-risk environment. FIG. 10 shows a flow diagram of process 1000 for implementing a continuous contact feature according to an embodiment of the present invention. Process 1000 can be implemented, e.g., in any of the user devices described above.

Process 1000 can begin at block 1002 when the user unlocks the device. In some embodiments, a passcode or passcode entry process as described above can be used to unlock the device; other processes can also be used. At block 1004, process 1000 can determine whether the continuous-contact feature should be enabled. As noted above, in some embodiments, a continuous contact feature can be, but need not be, enabled at all times while the device is unlocked. For instance, the continuous contact feature can be automatically enabled when the user launches a particular application or invokes a particular function, or it can be enabled in response to express user input. At block 1006, process 1000 can wait until a condition for enabling the continuous contact feature occurs.

When the determination is made to enable the continuous contact feature at block 1004, process 1000 can proceed to block 1008. At block 1008, process 1000 can detect tactile contact with a fingerprint sensor region, such as any of the side-surface and/or back-surface fingerprint sensor regions of FIGS. 9A-9C. In some embodiments, front-surface fingerprint sensor regions can be used in addition to or instead of back-surface and/or side-surface sensors. At block 1010, process 1000 can attempt to recognize the fingerprint, e.g., by analyzing the fingerprint detected by the fingerprint sensor region and determining whether the detected fingerprint matches a registered fingerprint. If the fingerprint is not recognized, the device can be locked at block 1012, and process 1000 can end.

If, at block 1010, the fingerprint is recognized, then at block 1014, process 1000 can monitor the fingerprint sensor region(s) to determine whether tactile contact is maintained or broken. In some embodiments, tactile contact is maintained if the same finger is continuously detected in contact with one fingerprint sensor region. It is to be understood that it is not necessary to reanalyze the fingerprint as long as contact with the fingerprint sensor region is unbroken, although periodic reanalysis can be performed if desired. In some embodiments, the user can switch contact points, e.g., transferring the phone from hand to hand or adjusting the grip, and this may cause a transitory loss of tactile contact, a change of which finger is in contact with a particular fingerprint sensor region, or a change of which fingerprint sensor region a particular finger is contacting. Where any shift in the arrangement of tactile contacts is detected, reanalysis of detected fingerprints can be performed to determine whether the fingerprint(s) now in contact with the fingerprint sensor region(s) are recognized. Thus, a transitory loss of tactile contact need not be considered as a breaking of tactile contact, as long as contact with a recognized fingerprint is restored within an acceptable time limit (e.g., lesser than 0.5 seconds or less than 0.2 seconds or some other threshold consistent with a user adjusting a hand position).

At block 1016, process 1000 can determine whether tactile contact has been broken. For instance, monitoring block 1014 can produce an indicator if tactile contact is broken. In some embodiments, any failure to maintain the same finger in contact with the same fingerprint sensor region can be identified as breaking tactile contact. In other embodiments, transitory loss of tactile contact (as described above) can be ignored, thus allowing the user to adjust hand position while using the device. If tactile contact is broken, the device can be locked at block 1012, and process 1000 can end.

If, at block 1016, tactile contact is not broken, then at block 1018, process 1000 can determine whether to disable continuous contact monitoring. For instance, if the user locks the device, monitoring can be discontinued. As another example, if continuous contact monitoring is initiated in connection with a particular application or device function, then process 1000 can exit if the user closes the application or function. If the determination is made to disable continuous contact monitoring, process 1000 can end at block 1020. In some embodiments, ending at block 1020 has no immediate effect on user interaction. For instance, the user can continue interacting with the device, the only difference being that after block 1020, the device does not lock in response to the user breaking tactile contact with it.

It will be appreciated that process 1000 described herein is illustrative and that variations and modifications are possible. Steps described as sequential may be executed in parallel, order of steps may be varied, and steps may be modified, combined, added or omitted. In some embodiments, monitoring of continuous tactile contact by recognized fingerprints can be used when the device is locked, e.g., to detect if the device is grabbed or dropped out of the user's hand. For instance, the user may be able to selectively activate an alarm function for use when the device is locked, and the alarm function can enable contours contact monitoring. Once the alarm function is activated, if the user breaks tactile contact with the device before deactivating the alarm function, the device can generate an alarm (e.g., a loud sound or emergency call).

Figures 11, 12:
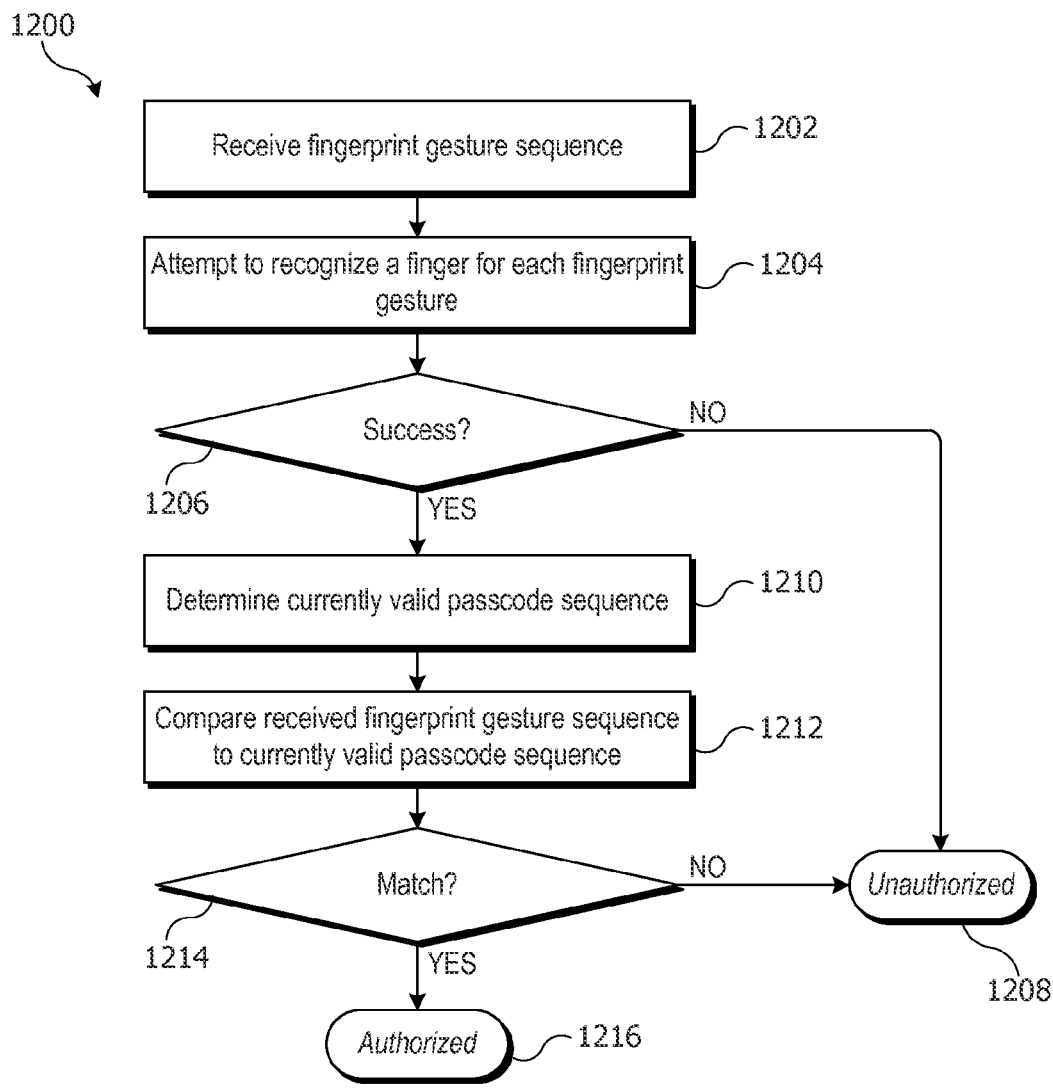
FIG. 11 shows an example of time-dependent passcodes according to an embodiment of the present invention.
FIG. 12 shows a flow diagram of a process for operating a device using a time-dependent passcode according to an embodiment of the present invention.

Other embodiments can provide other security features. For example, in some embodiments, a user can define time-dependent rules for determining a passcode to unlock a device. FIG. 11 shows an example of time-dependent passcodes according to an embodiment of the present invention. Chart 1100 lists a time-dependent rule and a corresponding passcode for each rule. In this example, the rule is based on whether the hour of the day is even (e.g., 2, 4, 6, 8, 10, 12 on a 12-hour clock) or odd (e.g., 1, 3, 5, 7, 9, 11 on a 12-hour clock). The passcode in this example can be entered using a virtual keypad such as virtual keys 504 of FIG. 5. The passcode for even-numbered hours in this example is different from the passcode for odd-numbered hours. This may make it harder for an observer to figure out the user's passcode because the user would be seen performing different fingerprint gesture sequences at different times. While the example shows two passcodes that are permutations of each other (same fingerprint gestures performed in a different order), it is to be understood that this is not required, and time-dependent passcodes can include different fingerprint gestures as well as different sequences.

More complex sets of rules with different time dependencies can also be defined, if desired, such as different passcodes for morning, afternoon, and evening; or different passcodes for different days of the week. Although only one time-dependent passcode would be valid for the user at any given time, all of the user's time-dependent passcodes can be associated with the same user, such that the same settings, preferences, available functions, and personal data is accessible using any of the passcodes. In some embodiments, the user can select both the passcodes and the time-dependent rules for when each passcode is valid, e.g., using a settings or preferences menu that is accessible at a time when the user's identity has already been authenticated.

FIG. 12 shows a flow diagram of process 1200 for granting access to a device (or a protected function of a device) using a time-dependent passcode according to an embodiment of the present invention. Process 1200 can be invoked, e.g., when a user attempts to unlock a device or to access a protected function of a device. At block 1202, process 1200 can receive a fingerprint gesture sequence that includes a series of fingerprint gesture descriptors, similarly to block 602 of process 600 described above. At block 1204, process 1200 can attempt to recognize a finger for each fingerprint gesture, similarly to block 604 of process 600 described above.

At block 1206, process 1200 can determine whether the attempt at block 1204 was successful, similarly to block 606 of process 600 described above. If the attempt is not successful, process 1200 can end at block 1208 with the user being unauthorized, in which case access to the protected function is not granted. In some embodiments, the user can be prompted to try again.

At block 1210, process 1200 can determine the currently valid passcode sequence. As noted above, the user can establish time-dependent rules such that different passcodes are valid at different times. Accordingly, block 1210 can include determining the current time, identifying the rule applicable to the current time, and using a lookup table (e.g., similar to chart 1100 of FIG. 11) to determine the currently valid passcode sequence from the rule.

At block 1212, process 1200 can compare the received fingerprint gesture sequence to the currently valid passcode sequence. Similarly to block 608 of process 600, this can include determining whether both the identified finger and the location touched correspond to the currently valid passcode sequence. If, at block 1214, the currently valid passcode sequence is not matched, process 1200 can end at block 1208 with the user being unauthorized. If the passcode sequence is matched, process 1200 can end at block 1216 with the user being authorized, in which case access to the protected function is granted.

It will be appreciated that process 1200 is illustrative and that variations and modifications are possible. Steps described as sequential may be executed in parallel, order of steps may be varied, and steps may be modified, combined, added or omitted. For instance, matching of fingerprints and touched locations can be performed concurrently. The passcode can be used to access any functionality or feature of the device, and different passcodes can be associated with different functions or features. For instance, a first passcode can be used to unlock the device and allow the user to invoke an application program (e.g., a banking program). Certain features within the application program may require the user to re-enter the first passcode or to enter a second, different passcode. Process 1200 can be invoked to verify each passcode, with the currently valid passcode being determined based on the time that process 1200 was invoked. It is also noted that although process 1200 is described with reference to fingerprint gestures, similar techniques can be used to implement time-dependent passcodes (or other time-dependent authentication credentials) that do not involve fingerprint recognition. For instance, with a voice-based authentication algorithm, the pass phrase to be spoken can be different for different times of day or days of the week or the like. With a numerical passcode, the code can incorporate a time-dependent digit or the like, and the time variation may make the passcode more difficult to guess by a would-be intruder.

In some embodiments, fingerprint gestures can be combined with other biometric data to provide enhanced security. For example, facial recognition can be performed by using a camera (e.g., front-facing camera 104 of FIG. 1) to capture an image of the user while the user touches a finger to a fingerprint sensor region (e.g., either or both of sensors 108a or 108b of FIG. 1, or any of sensors 208a-d of FIG. 2, or any of sensors 914, 924, 934 of FIGS. 9A-9C). By requiring the user to satisfy both facial recognition criteria and a fingerprint-gesture-based passcode, security for device 100 (or another user device) can be increased while requiring little or no additional user action. The user is likely to be looking at device 100 while unlocking it, and this can naturally place the user's face in the line of sight of front-facing camera 104; accordingly, all the user has to "do" is present the correct fingerprint-gesture-based passcode. Where additional biometric data is available, an equivalent level of security can be obtained with a simpler passcode. For instance, a single touch of a specified fingerprint sensor region with a specified registered fingerprint in combination with facial recognition may be sufficient to secure device 100.

Theoretically, it might be possible to spoof the facial recognition and the fingerprint gesture, e.g. by using a photo of the authorized user and a copy or reconstruction of the authorized user's fingerprint(s). If desired, further security can be provided using pulse-detection techniques such as photoplethysmography. For example, it is possible to use existing image analysis techniques to measure a user's pulse by capturing a sequence of images of the user's face and detecting subtle changes in skin reflectance due to cyclic fluctuations in blood volume as the heart beats. It is also possible to detect a pulse in a user's finger by using an image sensor that can detect both the fingerprint and the pulse.

According to some embodiments of the present invention, facial recognition and fingerprint recognition can be combined with pulse detection techniques to provide further enhancements to security. For example, a user can hold device 100 such that camera 104 is pointed at the user's face, and at the same time, the user can place a finger on control button 106a and/or control button 106b. Camera 104 can capture images of the user's face, which can be analyzed for facial feature recognition and to detect a pulse. At the same time, fingerprint sensor region 108a and/or 108b (which can incorporate optical imaging sensors) can capture images of the user's finger, which can be analyzed for fingerprint feature recognition and to detect a pulse. Authenticating the user can be based on facial feature recognition, fingerprint recognition, and matching between the pulse determined from the user's face and the pulse determined from the user's finger (e.g., pulse rate matching within accuracy limits of the pulse measurement technology, or synchronization of the pulse detected in the face and the finger). It should be noted that while the security algorithms may involve a significant amount of data gathering and analysis, the user input can be quite simple; for instance, the user can just look at the camera while holding a finger on a sensor.

Figure 13:
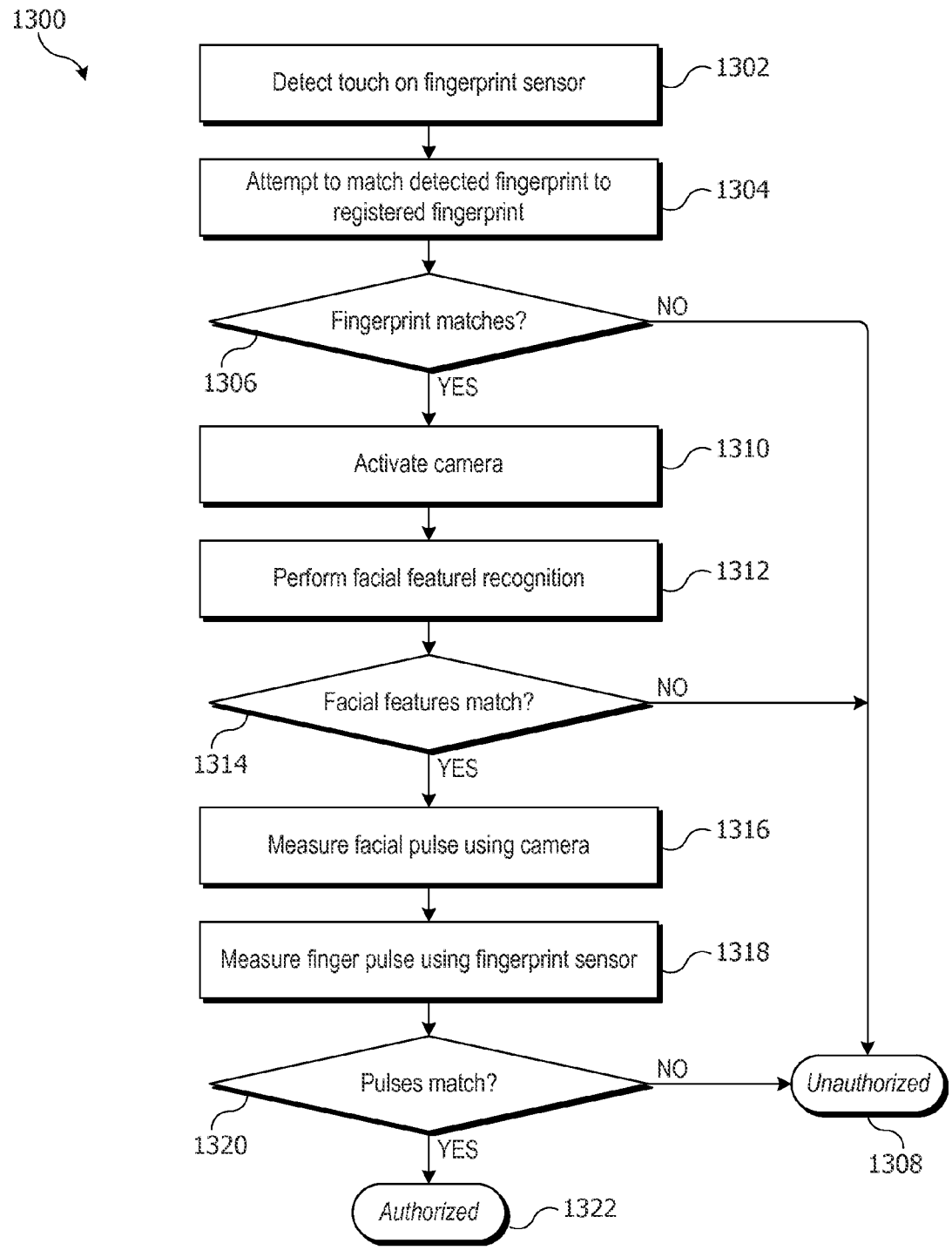
FIG. 13 shows a flow diagram of a process for authenticating a user according to an embodiment of the present invention.

FIG. 13 shows a flow diagram of process 1300 for authenticating a user according to an embodiment of the present invention. Process 1300 incorporates fingerprint recognition, facial-feature recognition, and pulse matching. Process 1300 can be implemented, e.g., in user device 100 or other user devices described above. Process 1300 can be invoked when a user attempts to unlock a device or to access a protected function of the device.

Process 1300 can begin at block 1302, when the device detects a touch on a fingerprint sensor region (e.g., sensor 108a or 108b of FIG. 1). At block 1304, process 1300 can attempt to match the detected fingerprint to a registered fingerprint. If, at block 1306 a match does not occur, process 1300 can end at block 1308 with the user being unauthorized.

If, at block 1306, the fingerprint matches, then at block 1310, process 1300 can activate a camera of the device (e.g., camera 104 of FIG. 1) to begin capturing images of the user's face. At block 1312, process 1300 can perform facial-feature recognition on the captured images. Conventional or other facial-feature recognition algorithms can be used. At block 1314, process 1300 can determine whether the facial features match those of the user whose registered fingerprint was matched at blocks 1304 and 1306. If the facial features do not match, process 1300 can end at block 1308 with the user being unauthorized.

If, at block 1314, the facial features match, process 1300 can proceed with pulse matching. For instance, at block 1316, process 1300 can measure a facial pulse based on images from camera 104, and at block 1318, process 1300 can measure a finger pulse using fingerprint sensor region 108a or 108b. Conventional or other pulse-measurement algorithms can be used. At block 1320, process 1300 can determine whether the facial pulse and finger pulse match each other. For instance, the pulses can be said to match if both measured pulse rates are the same (within accuracy limits of the pulse-measurement technology), or the pulses can be said to match if pulse events detected in the facial pulse correlate sufficiently in time with pulse events detected in the finger pulse. If, at block 1320, the facial and finger pulses do not match, process 1300 can end at block 1308 with the user being unauthorized. If the facial and finger pulses do match, process 1300 can end at block 1322 with the user being authorized.

It will be appreciated that process 1300 is illustrative and that variations and modifications are possible. Steps described as sequential may be executed in parallel, order of steps may be varied, and steps may be modified, combined, added or omitted. Any type of image recognition, feature matching, or pulse measuring algorithms can be used. Further, fingerprint recognition, facial recognition, and pulse matching can be performed in any order, including simultaneously. In some embodiments, a fingerprint gesture sequence, rather than just a single fingerprint gesture, can be incorporated into process 1300.

In some embodiments, multiple users can cooperate to unlock a device using fingerprint gestures. For instance, in examples described above it is assumed that the registered fingerprints used in a passcode all belong to the same user. However, this is not required. For instance, multiple users can register fingerprints on the same device, and a passcode can incorporate fingerprint gestures with the fingerprints of two (or more) different users. Where this is the case, the presence of all the users whose fingerprints are incorporated in the passcode would be needed to unlock the device. This can be useful, for instance, if one user is a child and a parent desires to restrict the child's access to the device, for instance, by requiring that the parent be present when the child is using the device or using particular functions of the device (such as functions involving purchases).

Figure 14:
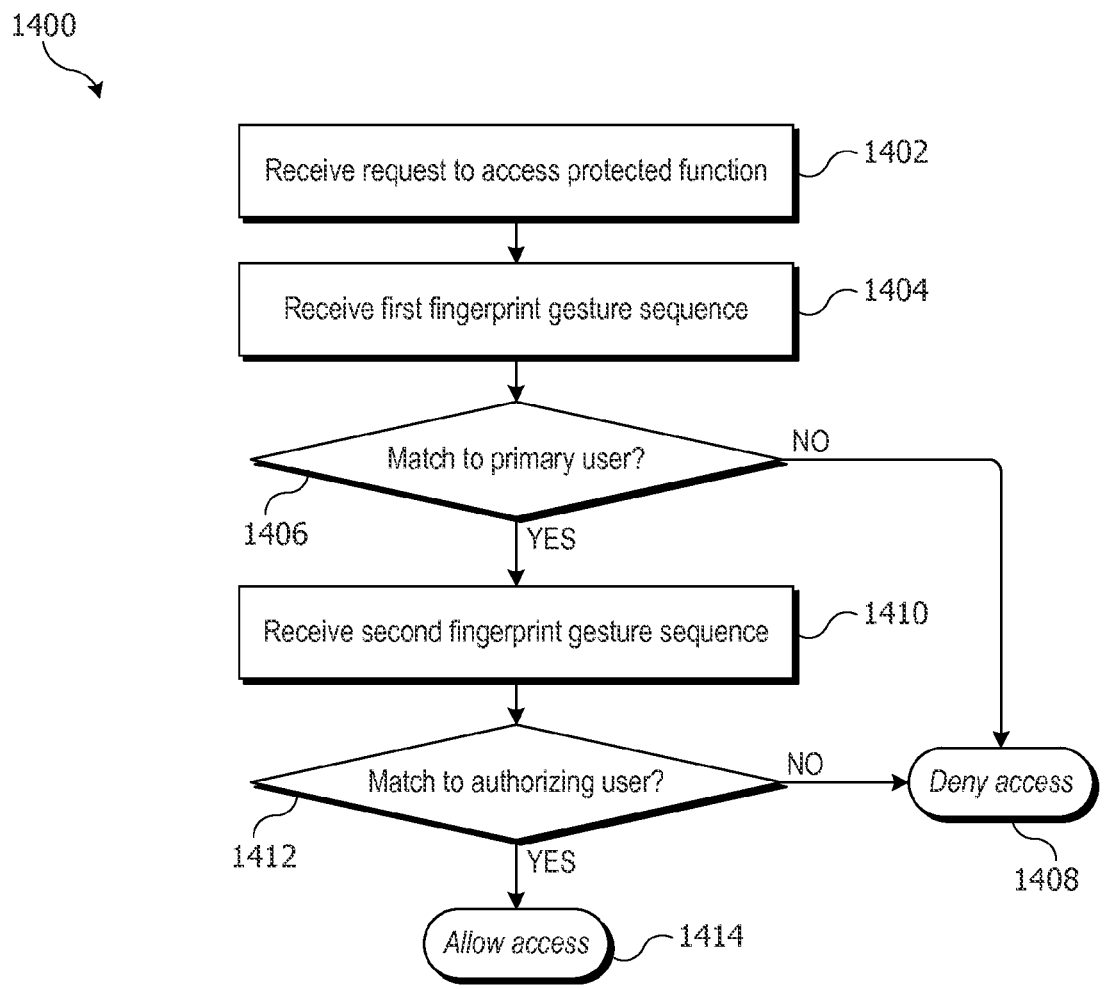
FIG. 14 shows a flow diagram of a process for implementing a two-part passcode according to an embodiment of the present invention.

For example, a user device can have a two-part passcode, where the child enters a first part (e.g., a first fingerprint gesture or fingerprint gesture sequence) and the parent enters a second part (or vice versa). FIG. 14 shows a flow diagram of process 1400 for implementing a two-part passcode according to an embodiment of the present invention. Process 1400 can be implemented, e.g., in user device 100 of FIG. 1 or any other user device.

At block 1402, process 1400 can receive a request to access a protected function. The protected function can include, for example, unlocking the device, launching a particular application on the device, using the device to make a purchase (e.g., within an application), or performing any other operation as desired. In some embodiments, a supervising user (such as a parent) can operate a settings menu to specify which functions are to be protected. In addition or instead, access restrictions can be automatically determined and applied, e.g., based on the user's age. The user device can maintain a table or other data structure to identify protected functions and can invoke process 1400 when a request to access a protected function is received.

At block 1404, process 1400 can receive a first fingerprint gesture sequence, which can be provided by the device's primary user. For instance, process 1400 can prompt the user to provide the fingerprint gesture sequence in response to the request to access the protected function. The user can enter the sequence, which can be similar or identical to any of the fingerprint gesture sequences described above.

At block 1406, process 1400 can determine whether the first fingerprint gesture sequence matches a passcode sequence previously established by the primary user of the device. Matching can be similar to other matching operations described above and can include matching the locations touched and the particular fingers used. If the received fingerprint gesture sequence does not match the passcode sequence, process 1400 can end at block 1408, with access to the protected function being denied.

At block 1410, if the first fingerprint gesture sequence matches the passcode sequence, process 1400 can receive a second fingerprint gesture sequence. For instance, process 1400 can prompt the user to have an authorizing user (e.g., a parent) enter a passcode, and the authorizing user can enter a fingerprint gesture sequence in response to the prompt.

At block 1412, process 1400 can determine whether the second fingerprint gesture sequence matches a passcode sequence previously established by an authorizing user. It is assumed that the authorizing user has established a passcode, e.g., during an initial device setup process or the like. Matching can be similar to other matching operations described above, with the fingerprints being required to match the authorizing user's fingerprints. If the received second fingerprint gesture sequence does not match the authorizing user's passcode sequence, process 1400 can end at block 1408, with access to the protected function being denied. If the received second fingerprint sequence does match the authorizing user's passcode sequence, process 1400 can end at block 1414 with access being granted.

It will be appreciated that process 1400 is illustrative and that variations and modifications are possible. Steps described as sequential may be executed in parallel, order of steps may be varied, and steps may be modified, combined, added or omitted. For instance, the primary user's and authorizing user's passcodes can be entered in either order or concurrently (e.g., on different areas of the device). Use of fingerprint gestures can make it more difficult for the primary user to access protected functions when the authorizing user is not physically present; even if the primary user knows the authorizing user's passcode sequence, differences in the fingerprints can make it difficult to spoof.

Further, in some embodiments, the primary user and authorizing user can provide their respective fingerprint gesture sequences on different devices. FIGS. 15A-15D show an example of an interaction where a primary user operating first device 1500 and an authorizing user (or "authorizer") operating second device 1550 can cooperate to unlock a protected function on first device 1500 according to an embodiment of the present invention. Devices 1500 and 1550 can each be similar or identical to any of the user devices described above. For instance, device 1500 can include fingerprint sensor regions 1502a, 1502b, and device 1550 can include fingerprint sensor regions 1552a, 1552b.

Figure 15A:
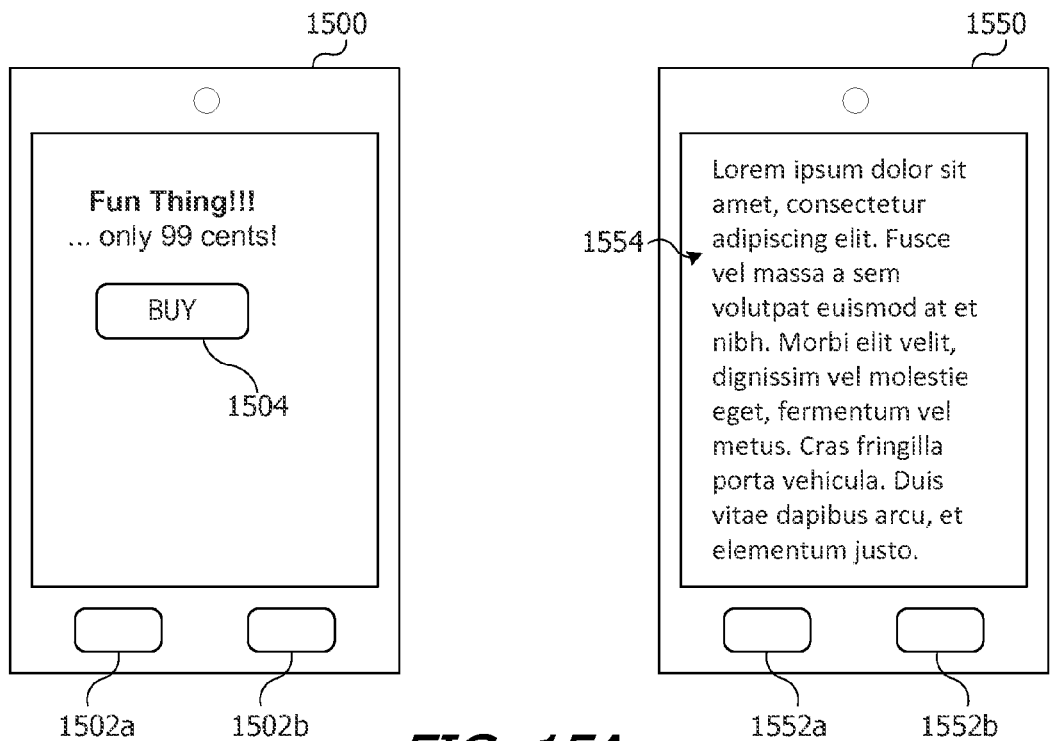
FIGS. 15A-15D show an example of an interaction where a primary user operating a first device and an authorizing user operating a second device can cooperate to unlock a protected function according to an embodiment of the present invention.

In FIG. 15A, first device 1500, which in this example is operated by a primary user, is presenting a prompt to invoke a protected function. In this case, selecting "BUY" button 1504 can result in making a purchase, which can be a protected function. At the same time, second device 1550 can be operated by an authorizing user to perform an unrelated activity. For instance, second device 1550 can be executing a reading application and displaying text page 1554.

Figure 15B:
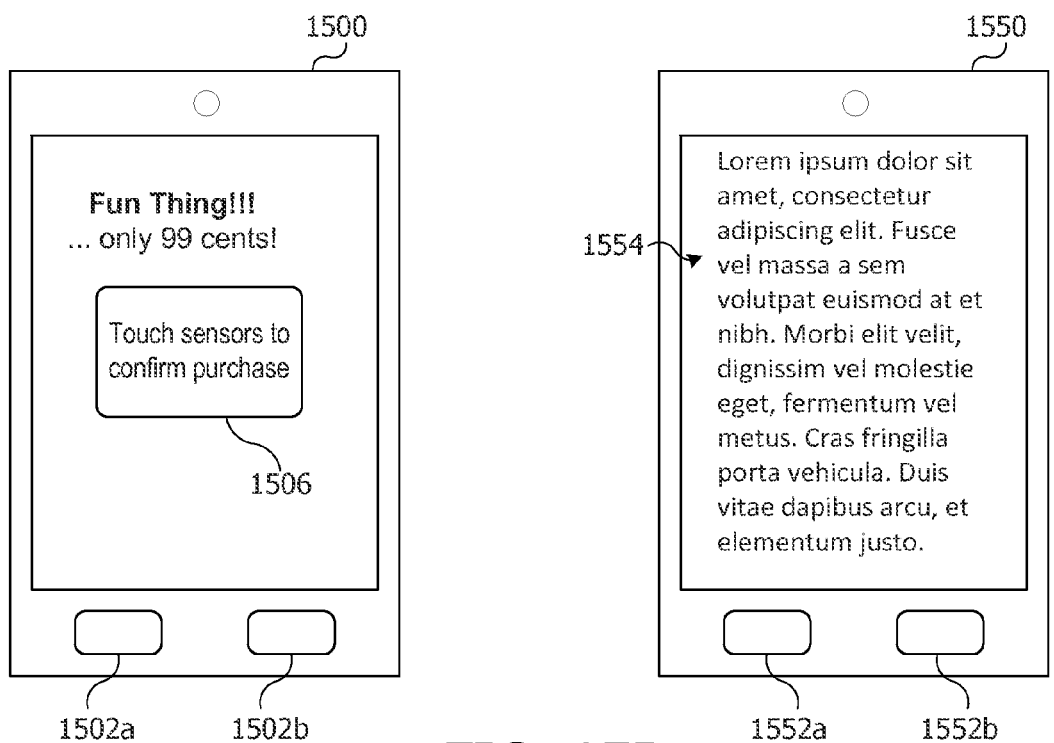

As shown in FIG. 15B, if the primary user selects BUY button 1502, this can correspond to invoking a protected function of first device 1500. The primary user can be prompted by prompt 1506 to perform a fingerprint gesture sequence. So far, there is no effect on second device 1550, which can continue to display text 1554.

Figure 15C:
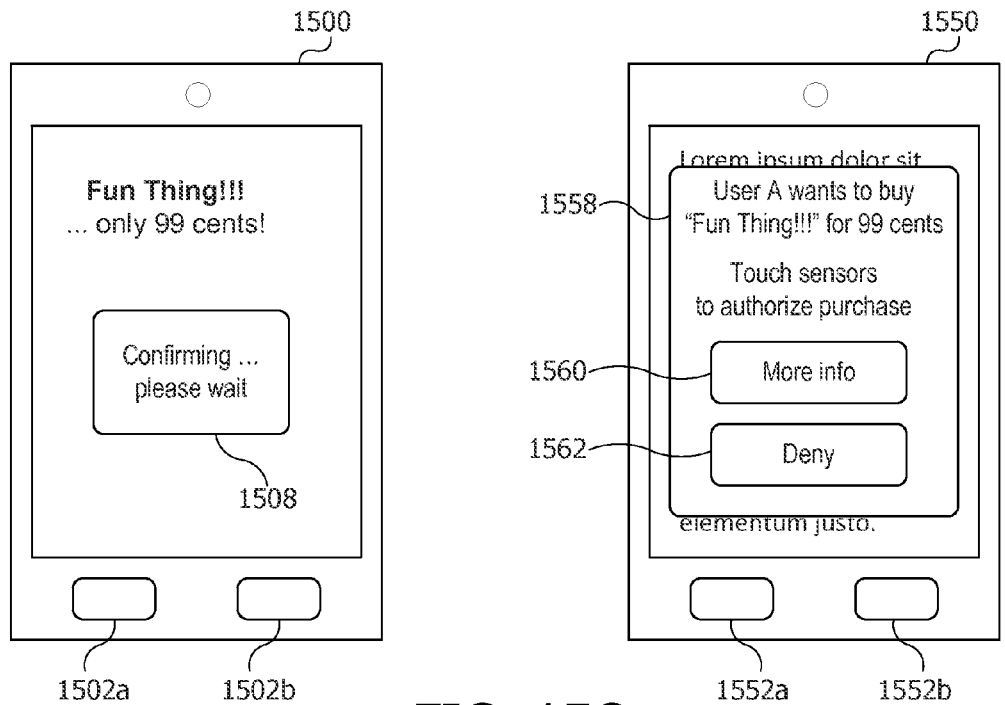

As shown in FIG. 15C, if the primary user successfully enters a fingerprint-gesture-based passcode (e.g., by touching buttons 1502a, 1502b in an order and with particular fingers that match a previously established passcode sequence), first device 1500 can initiate a process to obtain verification by the authorizing user. For instance, first device 1500 can send a message to second device 1550 (directly or via a network or server as described below) requesting verification by the authorizing user. During this process, first device 1500 can present "wait" message 1508. Second device 1550 can present notification 1558 indicating the function that the user of first device 1500 is attempting to invoke. Notification 1558 can prompt the authorizing user to enter a fingerprint-gesture-based passcode on second device 1550 to authorize the action. In some embodiments, notification 1558 can also provide other options, such as obtaining more information by selecting "More Info" button 1560 or denying the request by selecting "Deny" button 1562.

Figure 15D:
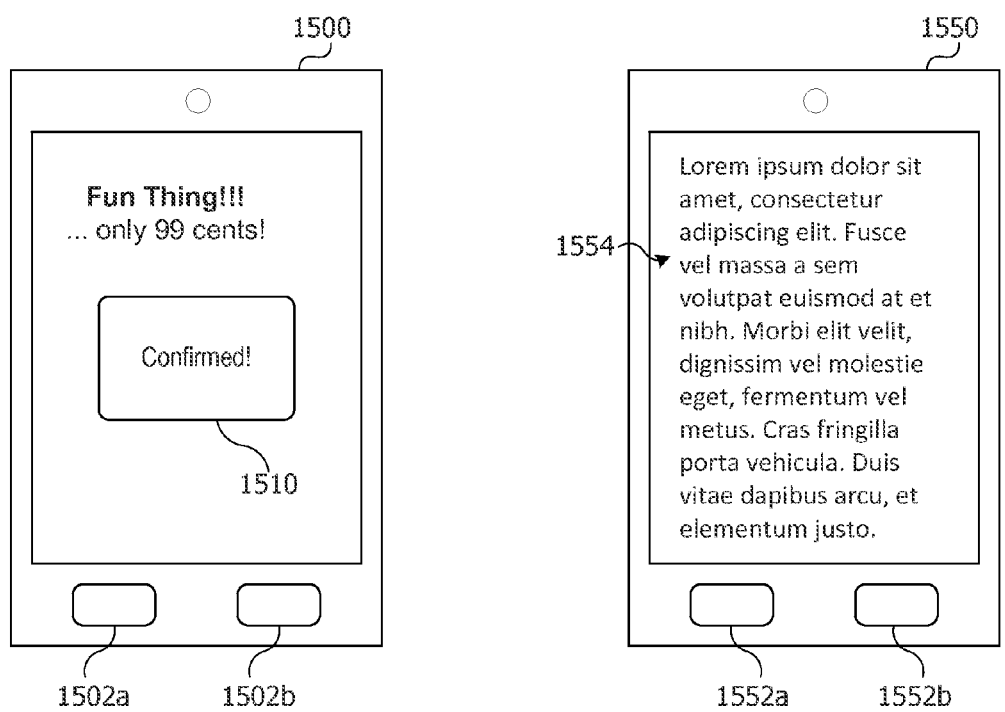

As shown in FIG. 15D, if the authorizing user successfully enters a fingerprint-gesture-based passcode (e.g., by touching buttons 1552a, 1552b in an order and with particular fingers that match a previously established passcode sequence), second device 1550 can notify first device 1500. First device 1500 can perform the requested action, e.g., completing the purchase. First device 1500 can notify the primary user, for instance, by presenting a confirmation message 1510. Second device 1550 can resume the activity that was being performed when the notification was received (e.g., displaying text 1554).

Figure 16:
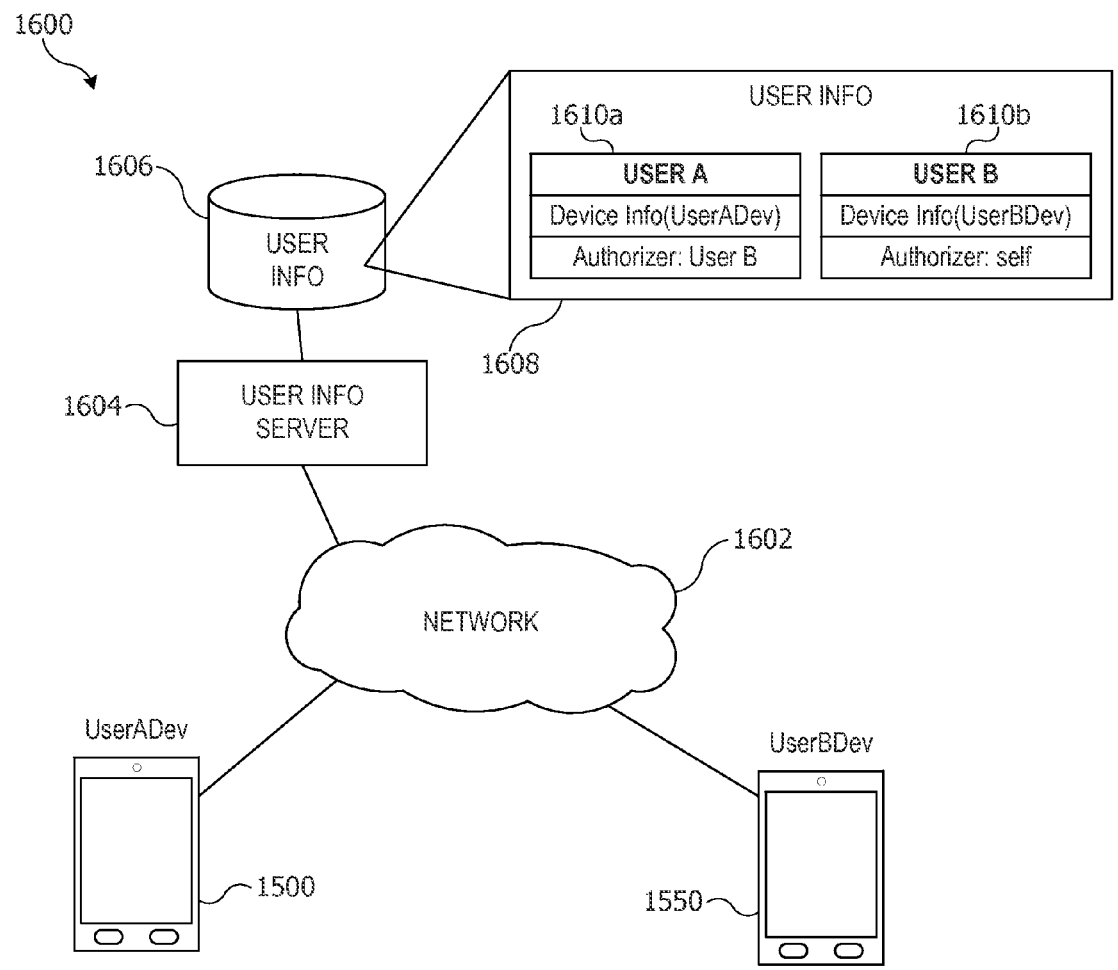
FIG. 16 shows a system according to an embodiment of the present invention.

In some embodiments, the interaction between first device 1500 and second device 1550 can be mediated by a server that communicates with both devices. FIG. 16 shows a system 1600 according to an embodiment of the present invention. In system 1600, first user device 1500 and second user device 1550 can be in communication with network 1602 (e.g., the Internet). User information server 1604 can also be connected to network 1602. User information server 1604 can be provided by various entities, such as a manufacturer of user devices, an e-commerce provider, or any other entity that provides content or services to network-enabled user devices. All connections can be wired or wireless as desired.

User information server 1604 can maintain user information data store 1606 (e.g., a database). User information data store 1606 can maintain information about users and/or user devices that access content or services provided by the entity that operates user information server 1604. For example, as shown in inset 1608, user information record 1610a, 1610b for a given user can include device information identifying the user's device (or multiple devices if desired) and providing information usable to send messages to the user's device (e.g., a phone number or other device address). User information record 1610a for user "A" can also include authorizer information identifying a different user (user "B") as being required to authorize access by user A to a protected function. Accordingly, attempts by user A to access a protected function can be denied unless user B provides authorization. In this example, user B has "self" as authorizer, meaning that user B can access protected functions with just her own authorization.

In operation, when user A attempts to access a protected function on device 1500 (e.g., making a purchase as shown in FIGS. 15A-15D), device 1500 can send the request to server 1604. Using user information record 1610a, server 1604 can determine that authorization from user B is required, and using user information record 1610b, server 1604 can determine that user B can be reached by sending a message to device 1550. Accordingly, server 1604 can send an approval request to device 1550 and receive a response. Based on the response, server 1604 can determine whether to allow or deny the request by user A to access the protected function. When user B attempts to access a protected function on device 1550, server 1604 can determine from user information record 1610b that user B is self-authorizing and can allow the request without requiring another user or device to provide authorization.

Examples of specific processes that can be implemented in first device 1500, server 1604, and second device 1550 to implement an authorization process will now be described. In these examples, users can verify their identity using fingerprint gesture sequences that they have previously established as passcode sequences at their respective devices, similarly to examples described above. Verification of each fingerprint gesture sequence can be performed locally on the device that receives the sequence. In the description that follows, first device 1500 can be any device that makes a request to access a protected function, and second device 1550 can be any device operated by a user who is the designated authorizer for some other user (e.g., a parent can be the designated authorizer for a child).

Figure 17:
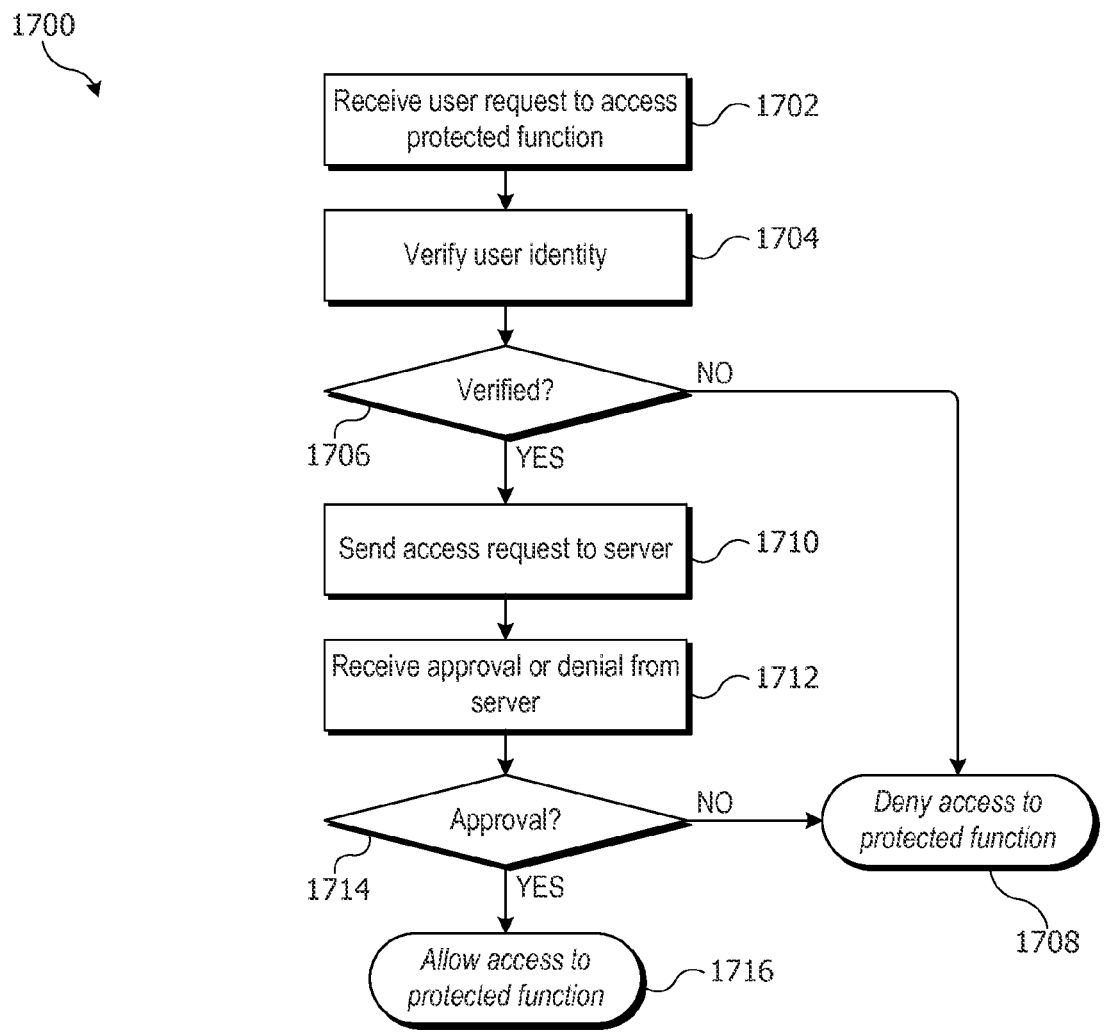
FIG. 17 shows a flow diagram of an authorization process that can be implemented in a first user device according to an embodiment of the present invention.

FIG. 17 shows a flow diagram of process 1700 that can be implemented in first device 1500 according to an embodiment of the present invention. First device 1500 can be a device that makes a request to access a protected function.

At block 1702, first device 1500 can receive a request to access a protected function. As described above, any function of the device can be designated as protected. At block 1704, first device 1500 can verify the user's identity based on a fingerprint gesture sequence. For example, first device 1500 can prompt the user to enter a previously established passcode that incorporates a fingerprint gesture sequence. At block 1706, first device 1500 can determine whether the user's identity has been verified, similarly to processes described above. If the user's identity is not verified, process 1700 can end at block 1708, with access being denied.

If, at block 1706, the user's identity is verified, then at block 1710, first device 1500 can send an access request to server 1604. In this example, first device 1500 does not need to know whether any other user's authorization is required. Server 1604 can make that determination and obtain any required authorization (e.g., as described below). At block 1712, first device 1500 can receive either an approval or a denial of the access request from server 1604. At block 1714, in the event of a denial, process 1700 can end at block 1708; in the event of approval, process 1700 can end at block 1714, with access to the protected function being allowed.

Figure 18:
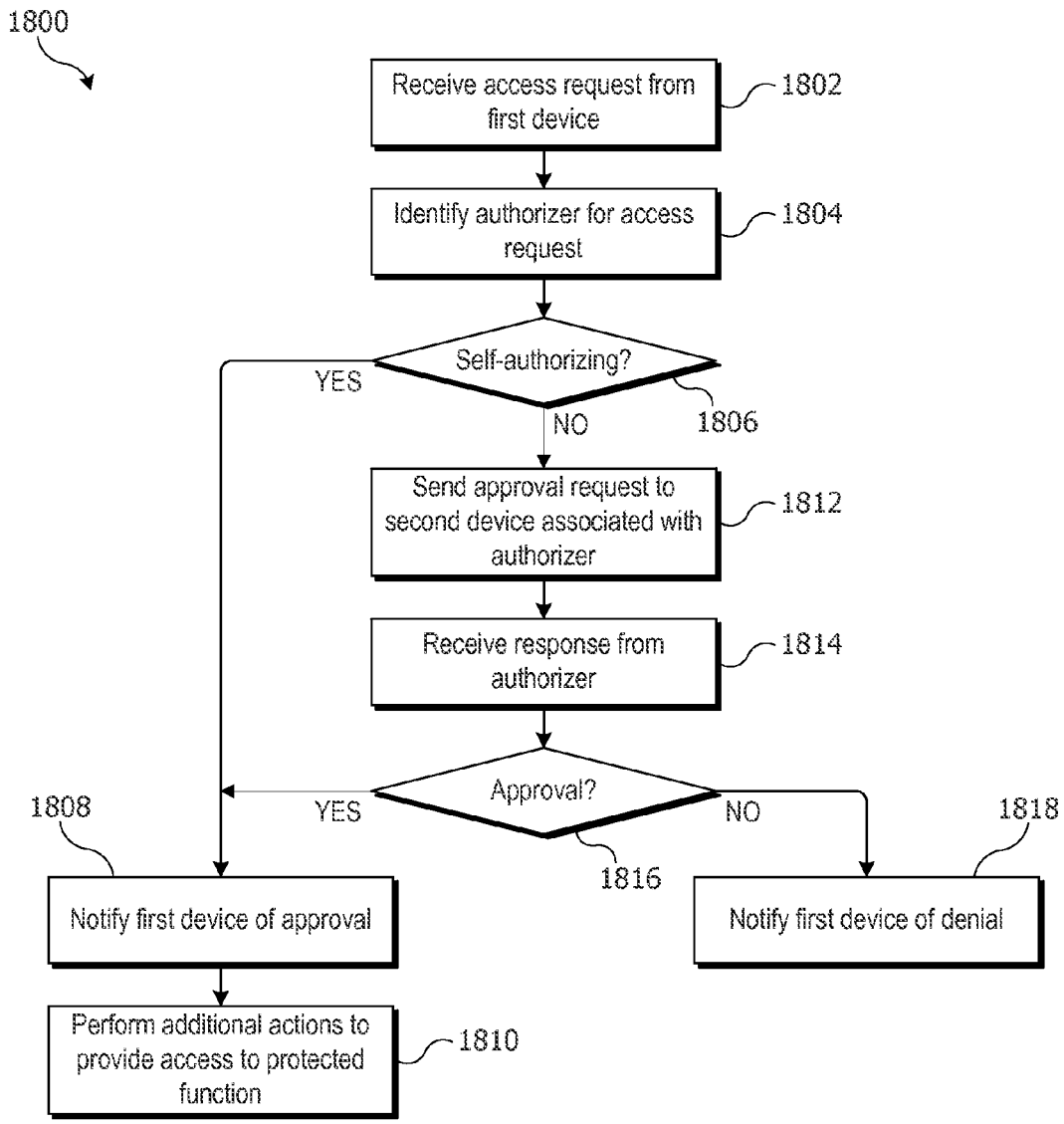
FIG. 18 shows a flow diagram of an authorization process that can be implemented in a server according to an embodiment of the present invention.

FIG. 18 shows a flow diagram of process 1800 that can be implemented in server 1604 according to an embodiment of the present invention. Server 1604 can be any server that processes requests by user devices to access protected functions.

At block 1802, server 1604 can receive an access request from a first device (e.g., first device 1500). The request can be generated, e.g., during execution of process 1700 described above. At block 1804, server 1604 can identify an authorizer for the request. For instance, server 1604 can access user information record 1610a.

At block 1806, server 1604 can determine whether the user is self-authorizing, as would be the case for user B but not for user A in the example of FIG. 16. If the user is self-authorizing, then at block 1808, server 1604 can notify the requesting device of the approval and can perform any other actions that may be appropriate to provide access to the protected function at block 1810. For instance, if the protected function relates to retrieving content, server 1604 can retrieve the content and send it to the requesting device. If the protected function relates to a purchase, server 1604 can perform a purchase transaction. Other actions can be supported in addition to or instead of these examples.

If, at block 1806, the user is not self-authorizing, then at block 1812, server 1604 can send an approval request to a second user device associated with the authorizer. For example, referring to FIG. 16, if a request is received from first device 1500, server 1604 can determine from user information record 1610a that user B is the authorizer. Server 1604 can then determine from user information record 1610b that an approval request should be sent to device 1550 and can send the approval request at block 1812. The approval request can include information identifying the requesting user, the first device, and/or the particular protected function to which access is being requested.

The second device can receive and respond to the approval request, e.g., as described below. At block 1814, server 1604 can receive a response to the approval request, which can be either an approval response or a denial response. If, at block 1816, the response is an approval, server 1604 can proceed to block 1808 to grant the access as described above. In some embodiments, the notification to the first device at block 1808 can include an identifier of the approving authorizer (e.g., user B). If, at block 1816, the response is a denial, server 1604 can proceed to block 1818 to notify the first device that access is denied. In some embodiments, the notification to the first device at block 1818 can include an identifier of the denying authorizer.

It should be understood that in some embodiments, user requests user can sometimes be denied for other reasons, even if the authorizer approves. For instance, there can be situations where the requesting user has not been granted permission by server 1604 to access a requested content item, and server 1604 can deny a request based on lack of permission, regardless of whether an authorizer approves.

Figure 19:
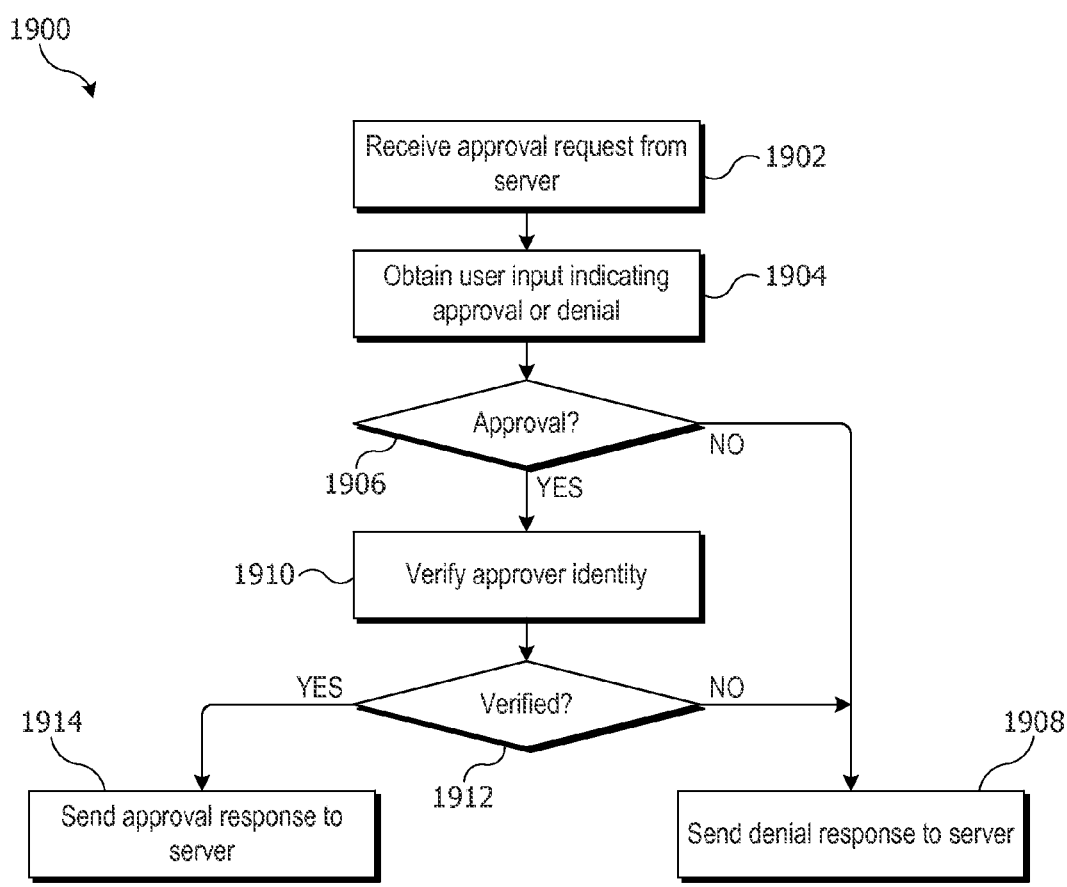
FIG. 19 shows a flow diagram of an authorization process that can be implemented in a second user device according to an embodiment of the present invention.

FIG. 19 shows a flow diagram of process 1900 that can be implemented in a second device 1550 according to an embodiment of the present invention. Second device 1550 can be a device that is owned or operated by a user who is a designated authorizer for another user.

At block 1902, second device 1550 can receive an approval request from server 1604. The approval request can be received at any time, regardless of what other operations second device 1550 may be performing.

At block 1904, second device 1550 can obtain user input indicating whether the user approves or denies the request. For example, in response to receiving the approval request at block 1902, second device 1550 can present a notification prompt such as notification 1558 of FIG. 15C, and the user can respond to the prompt.

At block 1906, second device 1550 can determine whether the user input indicates approval or denial. If the user input indicates denial, then at block 1908, second device 1550 can send a denial response to server 1604. Process 1900 can end.

If, at block 1906, the user input indicates approval, then at block 1910, second device 1550 can verify the approving user's identity based on a fingerprint gesture sequence. For example, second device 1550 can prompt the user to enter a previously established passcode that incorporates a fingerprint gesture sequence. In some embodiments, the user can indicate approval by entering the passcode at block 1904, and a separate prompt can be omitted. At block 1912, second device 1550 can determine whether the approving user's identity has been verified. If not, second device 1550 can send a denial response to server 1604 at block 1908, and process 1900 can end. If, at block 1912, the approving user's identity is verified, then at block 1914, second device 1550 can send an approval response to server 1604, and process 1900 can end.

Regardless of whether process 1900 results in an approval response or a denial response, upon completion of process 1900, second device 1550 can resume any operation it was performing at the time the approval request was received.

It will be appreciated that processes 1700, 1800, and 1900 are illustrative and that variations and modifications are possible. Steps described as sequential may be executed in parallel, order of steps may be varied, and steps may be modified, combined, added or omitted. In some embodiments, multiple authorizers can be identified for the same requesting user. For instance, both parents can be authorizers for a child. Where multiple authorizers are identified for one requesting user, further policy preferences can be established, such as which authorizer should be asked first or how many authorizers need to approve a particular request. Further, while in the examples above, the requesting user and the authorizer each verify their identities using fingerprint gesture sequences, those skilled in the art will recognize that other techniques for verifying user identity, including techniques that do not rely on fingerprints, can also be substituted. Examples of alternative identity-verification techniques include numeric or alphanumeric passcodes, passwords, or passphrases; voice recognition, retina scans, or other biometric identification techniques; and so on. In some embodiments, the identity-verification techniques used by the requesting user and the authorizing user can be different from each other.

In the example described above, identity verification is performed locally on each user device. In some embodiments, the user devices can send identity-verifying information to the server, and the server can perform identity verification. Communication between user devices and the server can take place using secure channels (e.g., using encryption), and the server and/or the user device can require its communication partner to verify its identity (e.g., using cryptographic authentication techniques). This can be particularly useful if identity-verifying information is being sent between devices and the server.

In still other embodiments, a server can be omitted. For instance, user device 1500 can have internal settings to indicate when approval from an authorizer is required and to specify one or more other user devices from which approvals should be requested when required. User device 1500 can send its approval requests to the specified device, either via direct point-to-point communication or via a network, without relying on a server. User device 1550 can send its approval or denial responses to device 1500 through the same channel, again without relying on a server.

While the invention has been described with respect to specific embodiments, one skilled in the art will recognize that numerous modifications are possible. Passcodes can be used to unlock the device (e.g., as a prerequisite to allowing access to most or all device functions) or to unlock specific functions of the device (e.g., particular applications or functionalities such as purchasing functions, communication functions using particular channels, or the like), and different passcodes can be applied to different functions. For instance, a user who is an authorizer for another user can have a separate passcode just for authorizing the other user. Further, multiple passcodes can be required at different stages of device operation, such as a first passcode to unlock the device and a second, different, passcode to unlock a particular application or function. Passcodes based on fingerprint gestures as described herein can be used at any point in the operation of a device that calls for user authentication.

Some embodiments described herein incorporate fingerprint recognition operations, in which features of a detected fingerprint are compared to features of a set of registered fingerprints. In instances where a fingerprint is not recognized, a representation of the unrecognized fingerprint can be saved as unrecognized fingerprint data. Unrecognized fingerprint data can be saved locally on the user device, or it can be saved in a remote location. In some embodiments, a user device can save unrecognized fingerprint data to an online content management service, such as the Dropbox service provided by Dropbox, Inc., assignee of the present application, that allows a user to store content and access stored content using various network-connected devices. For example, the authorized user may have installed an app provided by the online content management service on the user device and linked the app to the authorized user's account with the online content management service. If the user device fails to recognize a fingerprint, the user device can save the unrecognized fingerprint data to the authorized user's account on the online content management service. The authorized user can access the unrecognized fingerprint data via the online content management service, regardless of whether the user device is not in the authorized user's possession. Unrecognized fingerprint data that is saved to a location remote from the user device can be used, for example, to facilitate locating a stolen device and/or identifying the thief.

Figure 20:
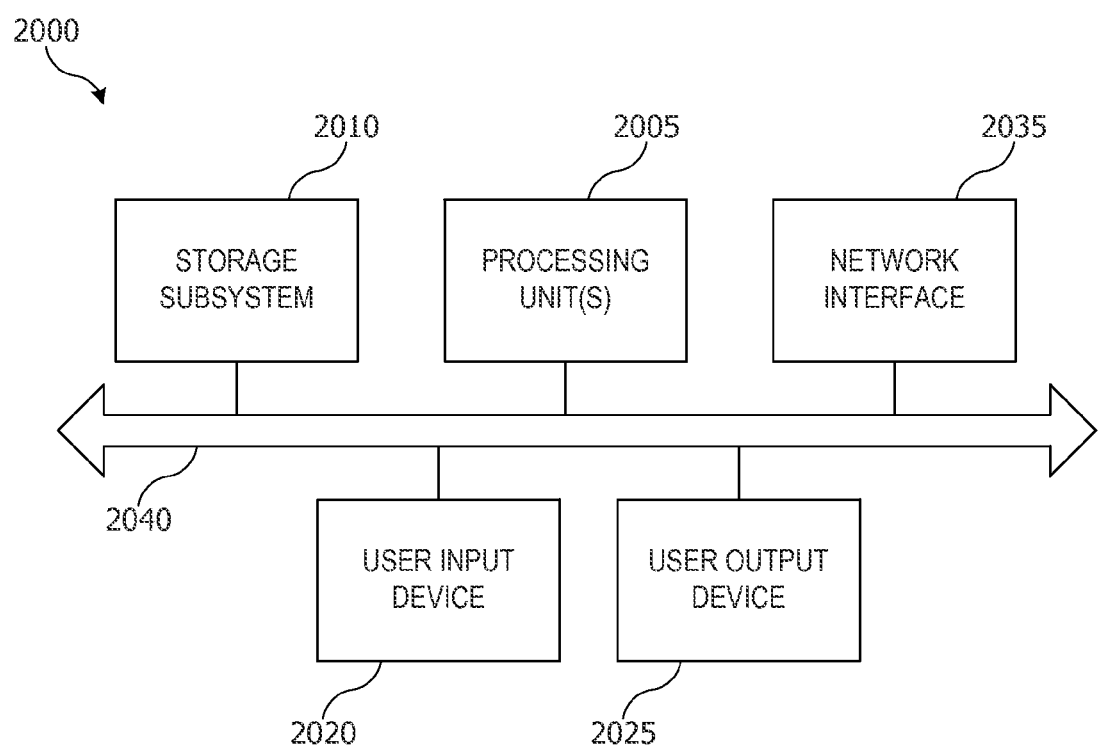
FIG. 20 shows a simplified block diagram of a representative computer system that can be used in an embodiment of the present invention.

Various operations described herein can be implemented on computer systems, which can include systems of generally conventional design. FIG. 20 shows a simplified block diagram of a representative computer system 2000. In various embodiments, computer system 2000 or similar systems can implement a user device (e.g., any of user devices 100, 200, 900 described above). Computer system 2000 can include processing unit(s) 2005, storage subsystem 2010, input devices 2020, output devices 2025, network interface 2035, and bus 2040.

Processing unit(s) 2005 can include a single processor, which can have one or more cores, or multiple processors. In some embodiments, processing unit(s) 2005 can include a general-purpose primary processor as well as one or more special-purpose co-processors such as graphics processors, digital signal processors, or the like. In some embodiments, some or all processing units 2005 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 2005 can execute instructions stored in storage subsystem 2010.

Storage subsystem 2010 can include various memory units such as a system memory, a read-only memory (ROM), and a permanent storage device. The ROM can store static data and instructions that are needed by processing unit(s) 2005 and other modules of computer system 2000. The permanent storage device can be a read-and-write memory device. This permanent storage device can be a non-volatile memory unit that stores instructions and data even when computer system 2000 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that processing unit(s) 2005 need at runtime.

Storage subsystem 2010 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 2010 can include removable storage media that can be readable and/or writeable; examples of such media include compact disc (CD), read-only digital versatile disc (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic disks, and so on. The computer readable storage media do not include carrier waves and transitory electronic signals passing wirelessly or over wired connections.

In some embodiments, storage subsystem 2010 can store one or more software programs to be executed by processing unit(s) 2005, such as an operating system, various applications, and so on. "Software" refers generally to sequences of instructions that, when executed by processing unit(s) 2005, cause computer system 2000 to perform various operations, thus defining one or more specific machine implementations that execute and perform the operations of the software programs. The instructions can be stored as firmware residing in read-only memory and/or applications stored in non-volatile storage media that can be read into volatile working memory for execution by processing unit(s) 2005. Software can be implemented as a single program or a collection of separate programs or program modules that interact as desired. From storage subsystem 2010, processing unit(s) 2005 can retrieve program instructions to execute and data to process in order to execute various operations described herein.

A user interface can be provided by one or more user input devices 2020 and one or more user output devices 2025. Input devices 2020 can include any device via which a user can provide signals to computer system 2000; computer system 2000 can interpret the signals as indicative of particular user requests or information. In various embodiments, input devices 2020 can include any or all of a keyboard, track pad, touch screen, mouse or other pointing device, scroll wheel, click wheel, dial, button, switch, keypad, microphone, and so on. In various embodiments, any or all of user input devices 2020 can incorporate a fingerprint sensor region, e.g., as described above.

User output devices 2025 can include any device via which computer system 2000 can provide information to a user. For example, user output devices 2025 can include a display to display images generated by computer system 2000. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 2025 can be provided in addition to or instead of a display. Examples include indicator lights, speakers, tactile "display" devices, printers, and so on.

In some embodiments, input device 2020 and output devices 2025 can interoperate to provide a graphical user interface ("GUI") that allows a user to interact with computer system 2000 by using an input device to select a control element displayed on the screen (e.g., by operating a pointing device such as a mouse or touching the location where a control element is displayed on a touch screen).

Network interface 2035 can provide voice and/or data communication capability for computer system 2000, including the ability to communicate with various messaging services and/or message management services to access and act upon messages. In some embodiments, network interface 2035 can include radio frequency (RF) transceiver components for accessing wireless voice and/or data networks (e.g., using cellular telephone technology, advanced data network technology such as 3G, 4G or EDGE, Wi-Fi (IEEE 802.11 family standards), or other mobile communication technologies, or any combination thereof), GPS receiver components, and/or other components. In some embodiments, network interface 2035 can provide wired network connectivity (e.g., Ethernet) in addition to or instead of a wireless interface. Network interface 2035 can be implemented using a combination of hardware (e.g., antennas, modulators/demodulators, encoders/decoders, and other analog and/or digital signal processing circuits) and software components.

Bus 2040 can include various system, peripheral, and chipset buses that communicatively connect the numerous components of computer system 2000. For example, bus 2040 can communicatively couple processing unit(s) 2005 with storage subsystem 2010. Bus 2040 can also connect to input devices 2020 and output devices 2025. Bus 2040 can also couple computing system 2000 to a network through network interface 2035. In this manner, computer system 2000 can be a part of a network of multiple computer systems (e.g., a local area network (LAN), a wide area network (WAN), an intranet, or a network of networks, such as the Internet.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 2005 can provide various functionality for computer system 2000. For example, computer system 2000 can execute any and all of the user authentication processes as described above.

It will be appreciated that computer system 2000 is illustrative and that variations and modifications are possible. Computer system 2000 can have other capabilities not specifically described here (e.g., mobile phone, global positioning system (GPS), power management, one or more cameras, various connection ports for connecting external devices or accessories, etc.). Further, while computer system 2000 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
   receiving, using a plurality of fingerprint sensor regions of a user device, a sequence of a plurality of fingerprint gestures, each fingerprint gesture, of the plurality of fingerprint gestures, including a touch by at least one finger on at least one fingerprint sensor region of the plurality of fingerprint sensor regions;

determining, based on the sequence of the plurality of fingerprint gestures, a sequence of a plurality of finger identifiers and corresponding plurality of touch locations, wherein each finger identifier, of the plurality of finger identifiers, indicates a specific one of a plurality of registered fingerprints that touched a fingerprint sensor region, of the plurality of fingerprint sensor regions, at the touch location in the sequence corresponding to the each finger identifier;

determining whether the sequence of the plurality of finger identifiers and corresponding plurality of touch locations matches a valid passcode sequence; and granting or denying access to a protected function of the user device based at least in part on whether the sequence of the plurality of finger identifiers and corresponding plurality of touch locations matches the valid passcode sequence.

2. The method of claim 1 wherein granting access includes unlocking the user device.

3. The method of claim 1 wherein the protected function includes one or more of launching a protected application or making a purchase.

4. The method of claim 1 wherein the valid passcode sequence includes at least two different finger identifiers and at least two different corresponding touch locations.

5. The method of claim 1 wherein the valid passcode sequence includes simultaneous contact by two different fingers with at least two different corresponding touch locations.

6. The method of claim 1 wherein at least one of the fingerprint gestures includes a motion path between a start location and an end location.

7. The method of claim 1 wherein determining whether the sequence of the plurality of finger identifiers and corresponding plurality of touch locations matches the valid passcode sequence includes:
determining a currently valid sequence based at least in part on a current time and a time-dependent rule,
wherein the currently valid sequence is used as the valid passcode sequence.

8. The method of claim 1 further comprising, in the event that the sequence of the plurality of finger identifiers and corresponding plurality of touch locations matches the valid passcode sequence:
sending an approval request to a second device; and
receiving an approval response or a denial response from the second device,
wherein access to the protected function is granted only if an approval response is received.

9. The method of claim 8 wherein the second device is a server and the server obtains the approval response or the denial response from an authorizing user device.

10. The method of claim 8 wherein the second device is an authorizing user device.

11. A method comprising:
receiving a first set of fingerprint gestures, the first set of fingerprint gestures including one or more fingerprint gestures, wherein each fingerprint gesture in the first set of one or more fingerprint gestures includes a touch by at least one finger on at least one fingerprint sensor region of a user device;
determining, based on the first set of one or more fingerprint gestures, a first set of one or more finger identifiers and corresponding one or more touch locations, wherein each finger identifier, in the first set of one or more finger identifiers and corresponding one or more touch locations, indicates a specific one of a plurality of registered fingerprints that touched a fingerprint sensor region of the user device at the touch location in the first set corresponding to the each finger identifier;
determining whether the first set of one or more finger identifiers and corresponding one or more touch locations matches a first valid passcode for a first user;
receiving a second set of fingerprint gestures, the second set of fingerprint gestures including one or more fingerprint gestures, wherein each fingerprint gesture in the second set of one or more fingerprint gestures includes a touch by at least one finger on at least one fingerprint sensor region of the user device;
determining, based on the second set of one or more fingerprint gestures, a second set of one or more finger identifiers and corresponding one or more touch locations;
determining whether the second set of one or more finger identifiers and corresponding one or more touch locations matches a second valid passcode for a second user other than the first user; and
granting or denying access to a protected function of the user device based at least in part on whether the first set of one or more finger identifiers and corresponding one or more touch locations matches the first valid passcode and whether the second set of one or more finger identifiers and corresponding one or more touch locations matches the second valid passcode.

12. The method of claim 11 wherein the protected function includes making a purchase.

13. The method of claim 11 wherein the first set of fingerprint gestures and the second set of fingerprint gestures are received concurrently using different ones of a plurality of fingerprint sensor regions of the user device.

14. A device comprising:
a user interface;
one or more fingerprint sensor regions disposed on a surface of the device; and
a processor coupled to the one or more fingerprint sensor regions and the user interface, the processor configured to:
receive, via the user interface, a user request to access a protected function of the device;
receive, using at least one of the one or more fingerprint sensor regions, a sequence of a plurality of fingerprint gestures, each fingerprint gesture, of the plurality of fingerprint gestures, including a touch by at least one finger on at least one fingerprint sensor region of the one or more fingerprint sensor regions;
determine, based on the sequence of the plurality of fingerprint gestures, a sequence of a plurality of finger identifiers and corresponding plurality of touch locations, wherein each finger identifier, of the plurality of finger identifiers, identifies a specific one of a plurality of registered fingerprints that touched a fingerprint sensor region, of the one or more fingerprint sensor regions, at the touch location in the sequence corresponding to the each finger identifier;
determine whether the sequence of the plurality of finger identifiers and corresponding plurality of touch locations matches a valid passcode sequence; and
grant or deny access to the protected function of the device based at least in part on whether the sequence of the plurality of finger identifiers and corresponding plurality of touch locations matches the valid passcode sequence.

15. The device of claim 14 wherein the user interface includes a touch-screen display, wherein at least one of the fingerprint sensor regions is disposed to coincide with a portion of the touch-screen display.

16. The device of claim 14 further comprising a control button, wherein at least one of the fingerprint sensor regions is disposed to coincide with the control button.

17. The device of claim 14 wherein the protected function includes unlocking the device.

18. The device of claim 14 wherein the protected function includes launching a particular application.

19. The device of claim 14 wherein the protected function includes making a purchase.

20. The device of claim 14 wherein the processor is further configured to recognize a plurality of different valid passcode sequences and to present different control elements at the user interface based at least in part on which of the different valid passcode sequences is matched.

\* \* \* \* \*